US012694892B2

(12) United States Patent
Campbell et al.

(10) Patent No.: US 12,694,892 B2
(45) Date of Patent: Jul. 28, 2026

(54) AUDITORY HEALTH MONITORING SYSTEM WITH AURICULAR DEVICE AND PHYSIOLOGICAL SENSOR

(71) Applicant: Masimo Corporation, Irvine, CA (US)

(72) Inventors: Luke John Campbell, N. Melbourne (AU); Valery G. Telfort, Irvine, CA (US)

(73) Assignee: Masimo Corporation, Irvine, CA (US)

( * ) Notice: Subject to any disclaimer, the term of this patent is extended or adjusted under 35 U.S.C. 154(b) by 126 days.

(21) Appl. No.: 18/677,802

(22) Filed: May 29, 2024

(65) Prior Publication Data

US 2024/0404549 A1 Dec. 5, 2024

Related U.S. Application Data

(60) Provisional application No. 63/602,274, filed on Nov. 22, 2023, provisional application No. 63/602,230, filed on Nov. 22, 2023, provisional application No. 63/505,942, filed on Jun. 2, 2023, provisional application No. 63/505,971, filed on Jun. 2, 2023.

(51) Int. Cl.
*G10L 25/66* (2013.01)
*H04R 1/10* (2006.01)
*H04R 29/00* (2006.01)

(52) U.S. Cl.
CPC ............ *G10L 25/66* (2013.01); *H04R 1/1083* (2013.01); *H04R 29/00* (2013.01); *H04R 1/1016* (2013.01)

(58) Field of Classification Search
CPC ....... G10L 25/66; H04R 1/1083; H04R 29/00; H04R 1/1016
USPC .............................. 381/23.1, 56, 58, 59, 312
See application file for complete search history.

(56) References Cited

U.S. PATENT DOCUMENTS 4,960,128 A 10/1990 Gordon et al.
4,964,408 A 10/1990 Hink et al.
5,319,355 A 6/1994 Russek
(Continued)

FOREIGN PATENT DOCUMENTS

WO WO 2014/079549 5/2014
WO WO 2018/087570 5/2018
WO WO 2018/146609 8/2018

OTHER PUBLICATIONS

US 2024/0016391 A1, 01/2024, Lapotko et al. (withdrawn)

*Primary Examiner* — William A Jerez Lora
(74) *Attorney, Agent, or Firm* — Knobbe, Martens, Olson & Bear, LLP

(57) ABSTRACT

A system for monitoring auditory health of a user can include an auricular device that can comprise a microphone configured to generate OAE audio data responsive to detecting one or more otoacoustic emissions originating from the inner ear of the user. One or more hardware processors associated with the auricular device can access the OAE audio data from the microphone; access physiological data of the user originating from a physiological sensor; determine a feature of the physiological data in a time-domain, the feature comprising a value of the physiological data exceeding a threshold; adjust a portion of the OAE audio data based on the feature of the physiological data, the portion of the OAE audio data corresponding to the feature of the physiological data in the time-domain; and determine one or more physiological characteristics of the user based on the OAE audio data.

20 Claims, 8 Drawing Sheets

(56) References Cited

U.S. PATENT DOCUMENTS

| | | | |
|---|---|---|---|
| 5,337,744 | A | 8/1994 | Branigan |
| 5,341,805 | A | 8/1994 | Stavridi et al. |
| 5,377,676 | A | 1/1995 | Vari et al. |
| 5,431,170 | A | 7/1995 | Mathews |
| 5,436,499 | A | 7/1995 | Namavar et al. |
| 5,456,252 | A | 10/1995 | Vari et al. |
| 5,479,934 | A | 1/1996 | Imran |
| 5,482,036 | A | 1/1996 | Diab et al. |
| 5,494,043 | A | 2/1996 | O'Sullivan et al. |
| 5,533,511 | A | 7/1996 | Kaspari et al. |
| 5,590,649 | A | 1/1997 | Caro et al. |
| 5,602,924 | A | 2/1997 | Durand et al. |
| 5,638,816 | A | 6/1997 | Kiani-Azarbayjany et al. |
| 5,638,818 | A | 6/1997 | Diab et al. |
| 5,645,440 | A | 7/1997 | Tobler et al. |
| 5,671,914 | A | 9/1997 | Kalkhoran et al. |
| 5,726,440 | A | 3/1998 | Kalkhoran et al. |
| D393,830 | S | 4/1998 | Tobler et al. |
| 5,743,262 | A | 4/1998 | Lepper, Jr. et al. |
| 5,747,806 | A | 5/1998 | Khalil et al. |
| 5,750,994 | A | 5/1998 | Schlager |
| 5,758,644 | A | 6/1998 | Diab et al. |
| 5,760,910 | A | 6/1998 | Lepper, Jr. et al. |
| 5,890,929 | A | 4/1999 | Mills et al. |
| 5,919,134 | A | 7/1999 | Diab |
| 5,987,343 | A | 11/1999 | Kinast |
| 5,997,343 | A | 12/1999 | Mills et al. |
| 6,002,952 | A | 12/1999 | Diab et al. |
| 6,010,937 | A | 1/2000 | Karam et al. |
| 6,027,452 | A | 2/2000 | Flaherty et al. |
| 6,040,578 | A | 3/2000 | Malin et al. |
| 6,066,204 | A | 5/2000 | Haven |
| 6,115,673 | A | 9/2000 | Malin et al. |
| 6,124,597 | A | 9/2000 | Shehada et al. |
| 6,128,521 | A | 10/2000 | Marro et al. |
| 6,129,675 | A | 10/2000 | Jay |
| 6,144,868 | A | 11/2000 | Parker |
| 6,152,754 | A | 11/2000 | Gerhardt et al. |
| 6,184,521 | B1 | 2/2001 | Coffin, IV et al. |
| 6,232,609 | B1 | 5/2001 | Snyder et al. |
| 6,241,683 | B1 | 6/2001 | Macklem et al. |
| 6,253,097 | B1 | 6/2001 | Aronow et al. |
| 6,255,708 | B1 | 7/2001 | Sudharsanan et al. |
| 6,280,381 | B1 | 8/2001 | Malin et al. |
| 6,285,896 | B1 | 9/2001 | Tobler et al. |
| 6,308,089 | B1 | 10/2001 | von der Ruhr et al. |
| 6,317,627 | B1 | 11/2001 | Ennen et al. |
| 6,321,100 | B1 | 11/2001 | Parker |
| 6,334,065 | B1 | 12/2001 | Al-Ali et al. |
| 6,360,114 | B1 | 3/2002 | Diab et al. |
| 6,368,283 | B1 | 4/2002 | Xu et al. |
| 6,411,373 | B1 | 6/2002 | Garside et al. |
| 6,415,167 | B1 | 7/2002 | Blank et al. |
| 6,430,437 | B1 | 8/2002 | Marro |
| 6,430,525 | B1 | 8/2002 | Weber et al. |
| 6,463,311 | B1 | 10/2002 | Diab |
| 6,470,199 | B1 | 10/2002 | Kopotic et al. |
| 6,487,429 | B2 | 11/2002 | Hockersmith et al. |
| 6,505,059 | B1 | 1/2003 | Kollias et al. |
| 6,525,386 | B1 | 2/2003 | Mills et al. |
| 6,526,300 | B1 | 2/2003 | Kiani et al. |
| 6,534,012 | B1 | 3/2003 | Hazen et al. |
| 6,542,764 | B1 | 4/2003 | Al-Ali et al. |
| 6,580,086 | B1 | 6/2003 | Schulz et al. |
| 6,584,336 | B1 | 6/2003 | Ali et al. |
| 6,587,196 | B1 | 7/2003 | Stippick et al. |
| 6,587,199 | B1 | 7/2003 | Luu |
| 6,597,932 | B2 | 7/2003 | Tian et al. |
| 6,606,511 | B1 | 8/2003 | Ali et al. |
| 6,635,559 | B2 | 10/2003 | Greenwald et al. |
| 6,639,668 | B1 | 10/2003 | Trepagnier |
| 6,640,116 | B2 | 10/2003 | Diab |
| 6,640,117 | B2 | 10/2003 | Makarewicz et al. |
| 6,658,276 | B2 | 12/2003 | Kiani et al. |
| 6,661,161 | B1 | 12/2003 | Lanzo et al. |
| 6,697,656 | B1 | 2/2004 | Al-Ali |
| 6,697,658 | B2 | 2/2004 | Al-Ali |
| RE38,476 | E | 3/2004 | Diab et al. |
| RE38,492 | E | 4/2004 | Diab et al. |
| 6,738,652 | B2 | 5/2004 | Mattu et al. |
| 6,760,607 | B2 | 7/2004 | Ai-Ali |
| 6,788,965 | B2 | 9/2004 | Ruchti et al. |
| 6,816,241 | B2 | 11/2004 | Grubisic |
| 6,822,564 | B2 | 11/2004 | Al-Ali |
| 6,850,787 | B2 | 2/2005 | Weber et al. |
| 6,850,788 | B2 | 2/2005 | Al-Ali |
| 6,876,931 | B2 | 4/2005 | Lorenz et al. |
| 6,920,345 | B2 | 7/2005 | Al-Ali et al. |
| 6,934,570 | B2 | 8/2005 | Kiani et al. |
| 6,943,348 | B1 | 9/2005 | Coffin IV |
| 6,956,649 | B2 | 10/2005 | Acosta et al. |
| 6,961,598 | B2 | 11/2005 | Diab |
| 6,970,792 | B1 | 11/2005 | Diab |
| 6,985,764 | B2 | 1/2006 | Mason et al. |
| 6,990,364 | B2 | 1/2006 | Ruchti et al. |
| 6,998,247 | B2 | 2/2006 | Monfre et al. |
| 7,003,338 | B2 | 2/2006 | Weber et al. |
| 7,015,451 | B2 | 3/2006 | Dalke et al. |
| 7,027,849 | B2 | 4/2006 | Al-Ali |
| D526,719 | S | 8/2006 | Richie, Jr. et al. |
| 7,096,052 | B2 | 8/2006 | Mason et al. |
| 7,096,054 | B2 | 8/2006 | Abdul-Hafiz et al. |
| D529,616 | S | 10/2006 | Deros et al. |
| 7,133,710 | B2 | 11/2006 | Acosta et al. |
| 7,142,901 | B2 | 11/2006 | Kiani et al. |
| 7,225,006 | B2 | 5/2007 | Al-Ali et al. |
| RE39,672 | E | 6/2007 | Shehada et al. |
| 7,254,429 | B2 | 8/2007 | Schurman et al. |
| 7,254,431 | B2 | 8/2007 | Al-Ali et al. |
| 7,254,434 | B2 | 8/2007 | Schulz et al. |
| 7,274,955 | B2 | 9/2007 | Kiani et al. |
| D554,263 | S | 10/2007 | Al-Ali et al. |
| 7,280,858 | B2 | 10/2007 | Al-Ali et al. |
| 7,289,835 | B2 | 10/2007 | Mansfield et al. |
| 7,292,883 | B2 | 11/2007 | De Felice et al. |
| 7,341,559 | B2 | 3/2008 | Schulz et al. |
| 7,343,186 | B2 | 3/2008 | Lamego et al. |
| D566,282 | S | 4/2008 | Al-Ali et al. |
| 7,356,365 | B2 | 4/2008 | Schurman |
| 7,371,981 | B2 | 5/2008 | Abdul-Hafiz |
| 7,373,193 | B2 | 5/2008 | Al-Ali et al. |
| 7,377,794 | B2 | 5/2008 | Al-Ali et al. |
| 7,395,158 | B2 | 7/2008 | Monfre et al. |
| 7,399,282 | B2 | 7/2008 | John et al. |
| 7,415,297 | B2 | 8/2008 | Al-Ali et al. |
| 7,438,683 | B2 | 10/2008 | Al-Ali et al. |
| 7,483,729 | B2 | 1/2009 | Al-Ali et al. |
| D587,657 | S | 3/2009 | Al-Ali et al. |
| 7,500,950 | B2 | 3/2009 | Al-Ali et al. |
| 7,509,494 | B2 | 3/2009 | Al-Ali |
| 7,510,849 | B2 | 3/2009 | Schurman et al. |
| 7,514,725 | B2 | 4/2009 | Wojtczuk et al. |
| 7,519,406 | B2 | 4/2009 | Blank et al. |
| D592,507 | S | 5/2009 | Wachman et al. |
| 7,530,942 | B1 | 5/2009 | Diab |
| 7,587,052 | B2 | 9/2009 | Kasztelan |
| 7,593,230 | B2 | 9/2009 | Abul-Haj et al. |
| 7,596,398 | B2 | 9/2009 | Al-Ali et al. |
| 7,606,608 | B2 | 10/2009 | Blank et al. |
| 7,620,674 | B2 | 11/2009 | Ruchti et al. |
| D606,659 | S | 12/2009 | Kiani et al. |
| 7,629,039 | B2 | 12/2009 | Eckerbom et al. |
| 7,640,140 | B2 | 12/2009 | Ruchti et al. |
| 7,647,083 | B2 | 1/2010 | Al-Ali et al. |
| D609,193 | S | 2/2010 | Al-Ali et al. |
| D614,305 | S | 4/2010 | Al-Ali et al. |
| 7,697,966 | B2 | 4/2010 | Monfre et al. |
| 7,698,105 | B2 | 4/2010 | Ruchti et al. |
| RE41,317 | E | 5/2010 | Parker |
| RE41,333 | E | 5/2010 | Blank et al. |
| 7,729,733 | B2 | 6/2010 | Al-Ali et al. |
| 7,761,127 | B2 | 7/2010 | Al-Ali et al. |
| 7,764,982 | B2 | 7/2010 | Dalke et al. |
| D621,516 | S | 8/2010 | Kiani et al. |

(56) References Cited

U.S. PATENT DOCUMENTS

| | | | |
|---|---|---|---|
| 7,791,155 | B2 | 9/2010 | Diab |
| RE41,912 | E | 11/2010 | Parker |
| 7,880,626 | B2 | 2/2011 | Al-Ali et al. |
| 7,909,772 | B2 | 3/2011 | Popov et al. |
| 7,919,713 | B2 | 4/2011 | Al-Ali et al. |
| 7,937,128 | B2 | 5/2011 | Al-Ali |
| 7,937,129 | B2 | 5/2011 | Mason et al. |
| 7,941,199 | B2 | 5/2011 | Kiani |
| 7,957,780 | B2 | 6/2011 | Lamego et al. |
| 7,962,188 | B2 | 6/2011 | Kiani et al. |
| 7,976,472 | B2 | 7/2011 | Kiani |
| 7,990,382 | B2 | 8/2011 | Kiani |
| 8,008,088 | B2 | 8/2011 | Bellott et al. |
| RE42,753 | E | 9/2011 | Kiani-Azarbayjany et al. |
| 8,028,701 | B2 | 10/2011 | Al-Ali et al. |
| 8,048,040 | B2 | 11/2011 | Kiani |
| 8,050,728 | B2 | 11/2011 | Al-Ali et al. |
| RE43,169 | E | 2/2012 | Parker |
| 8,118,620 | B2 | 2/2012 | Al-Ali et al. |
| 8,130,105 | B2 | 3/2012 | Al-Ali et al. |
| 8,182,443 | B1 | 5/2012 | Kiani |
| 8,190,223 | B2 | 5/2012 | Al-Ali et al. |
| 8,203,438 | B2 | 6/2012 | Kiani et al. |
| 8,203,704 | B2 | 6/2012 | Merritt et al. |
| 8,213,649 | B2 | 7/2012 | Goldstein et al. |
| 8,219,172 | B2 | 7/2012 | Schurman et al. |
| 8,224,411 | B2 | 7/2012 | Al-Ali et al. |
| 8,229,532 | B2 | 7/2012 | Davis |
| 8,233,955 | B2 | 7/2012 | Al-Ali et al. |
| 8,255,026 | B1 | 8/2012 | Ai-Ali |
| 8,265,723 | B1 | 9/2012 | McHale et al. |
| 8,274,360 | B2 | 9/2012 | Sampath et al. |
| 8,277,390 | B2 | 10/2012 | Jennsen et al. |
| 8,280,473 | B2 | 10/2012 | Al-Ali |
| 8,315,683 | B2 | 11/2012 | Al-Ali et al. |
| RE43,860 | E | 12/2012 | Parker |
| 8,346,330 | B2 | 1/2013 | Lamego |
| 8,353,842 | B2 | 1/2013 | Al-Ali et al. |
| 8,355,766 | B2 | 1/2013 | MacNeish, III et al. |
| 8,374,665 | B2 | 2/2013 | Lamego |
| 8,388,353 | B2 | 3/2013 | Kiani et al. |
| 8,401,602 | B2 | 3/2013 | Kiani |
| 8,414,499 | B2 | 4/2013 | Al-Ali et al. |
| 8,418,524 | B2 | 4/2013 | Ai-Ali |
| 8,428,967 | B2 | 4/2013 | Olsen et al. |
| 8,430,817 | B1 | 4/2013 | Al-Ali et al. |
| 8,437,825 | B2 | 5/2013 | Dalvi et al. |
| 8,455,290 | B2 | 6/2013 | Siskavich |
| 8,457,707 | B2 | 6/2013 | Kiani |
| 8,471,713 | B2 | 6/2013 | Poeze et al. |
| 8,473,020 | B2 | 6/2013 | Kiani et al. |
| 8,509,867 | B2 | 8/2013 | Workman et al. |
| 8,515,509 | B2 | 8/2013 | Bruinsma et al. |
| 8,523,781 | B2 | 9/2013 | Al-Ali |
| D692,145 | S | 10/2013 | Al-Ali et al. |
| 8,571,617 | B2 | 10/2013 | Reichgott et al. |
| 8,571,618 | B1 | 10/2013 | Lamego et al. |
| 8,571,619 | B2 | 10/2013 | Al-Ali et al. |
| 8,577,431 | B2 | 11/2013 | Lamego et al. |
| 8,584,345 | B2 | 11/2013 | Al-Ali et al. |
| 8,588,880 | B2 | 11/2013 | Abdul-Hafiz et al. |
| 8,630,691 | B2 | 1/2014 | Lamego et al. |
| 8,641,631 | B2 | 2/2014 | Sierra et al. |
| 8,652,060 | B2 | 2/2014 | Al-Ali |
| 8,666,468 | B1 | 3/2014 | Ai-Ali |
| 8,670,811 | B2 | 3/2014 | O'Reilly |
| RE44,823 | E | 4/2014 | Parker |
| RE44,875 | E | 4/2014 | Kiani et al. |
| 8,688,183 | B2 | 4/2014 | Bruinsma et al. |
| 8,690,799 | B2 | 4/2014 | Telfort et al. |
| 8,702,627 | B2 | 4/2014 | Telfort et al. |
| 8,712,494 | B1 | 4/2014 | MacNeish, III et al. |
| 8,715,206 | B2 | 5/2014 | Telfort et al. |
| 8,723,677 | B1 | 5/2014 | Kiani |
| 8,740,792 | B1 | 6/2014 | Kiani et al. |
| 8,755,535 | B2 | 6/2014 | Telfort et al. |
| 8,755,872 | B1 | 6/2014 | Marinow |
| 8,764,671 | B2 | 7/2014 | Kiani |
| 8,768,423 | B2 | 7/2014 | Shakespeare et al. |
| 8,771,204 | B2 | 7/2014 | Telfort et al. |
| 8,781,544 | B2 | 7/2014 | Al-Ali et al. |
| 8,790,268 | B2 | 7/2014 | Al-Ali |
| 8,801,613 | B2 | 8/2014 | Al-Ali et al. |
| 8,821,397 | B2 | 9/2014 | Al-Ali et al. |
| 8,821,415 | B2 | 9/2014 | Al-Ali et al. |
| 8,830,449 | B1 | 9/2014 | Lamego et al. |
| 8,840,549 | B2 | 9/2014 | Al-Ali et al. |
| 8,840,565 | B2 | 9/2014 | Keefe |
| 8,852,094 | B2 | 10/2014 | Al-Ali et al. |
| 8,852,994 | B2 | 10/2014 | Wojtczuk et al. |
| 8,897,847 | B2 | 11/2014 | Al-Ali |
| 8,911,377 | B2 | 12/2014 | Al-Ali |
| 8,917,876 | B2 * | 12/2014 | Goldstein .............. H04R 3/007 345/82 |
| 8,989,831 | B2 | 3/2015 | Al-Ali et al. |
| 8,998,809 | B2 | 4/2015 | Kiani |
| 9,066,666 | B2 | 6/2015 | Kiani |
| 9,066,680 | B1 | 6/2015 | Al-Ali et al. |
| 9,095,316 | B2 | 8/2015 | Welch et al. |
| 9,106,038 | B2 | 8/2015 | Telfort et al. |
| 9,107,625 | B2 | 8/2015 | Telfort et al. |
| 9,131,881 | B2 | 9/2015 | Diab et al. |
| 9,137,609 | B2 | 9/2015 | Bruss et al. |
| 9,138,180 | B1 | 9/2015 | Coverston et al. |
| 9,153,112 | B1 | 10/2015 | Kiani et al. |
| 9,173,045 | B2 | 10/2015 | Bruss et al. |
| 9,192,329 | B2 | 11/2015 | Al-Ali |
| 9,192,351 | B1 | 11/2015 | Telfort et al. |
| 9,195,385 | B2 | 11/2015 | Al-Ali et al. |
| 9,211,095 | B1 | 12/2015 | Al-Ali |
| 9,218,454 | B2 | 12/2015 | Kiani et al. |
| 9,245,668 | B1 | 1/2016 | Vo et al. |
| 9,267,572 | B2 | 2/2016 | Barker et al. |
| 9,277,880 | B2 | 3/2016 | Poeze et al. |
| 9,307,928 | B1 | 4/2016 | Al-Ali et al. |
| 9,323,894 | B2 | 4/2016 | Kiani |
| D755,392 | S | 5/2016 | Hwang et al. |
| 9,326,712 | B1 | 5/2016 | Kiani |
| 9,332,364 | B2 | 5/2016 | Goldstein |
| 9,392,945 | B2 | 7/2016 | Al-Ali et al. |
| 9,408,542 | B1 | 8/2016 | Kinast et al. |
| 9,436,645 | B2 | 9/2016 | Al-Ali et al. |
| 9,445,759 | B1 | 9/2016 | Lamego et al. |
| 9,474,474 | B2 | 10/2016 | Lamego et al. |
| 9,480,435 | B2 | 11/2016 | Olsen |
| 9,510,779 | B2 | 12/2016 | Poeze et al. |
| 9,517,024 | B2 | 12/2016 | Kiani et al. |
| 9,532,722 | B2 | 1/2017 | Lamego et al. |
| 9,560,996 | B2 | 2/2017 | Kiani |
| 9,579,039 | B2 | 2/2017 | Jansen et al. |
| 9,622,692 | B2 | 4/2017 | Lamego et al. |
| D788,312 | S | 5/2017 | Al-Ali et al. |
| 9,649,054 | B2 | 5/2017 | Lamego et al. |
| 9,654,876 | B2 | 5/2017 | Neely |
| 9,697,928 | B2 | 7/2017 | Al-Ali et al. |
| 9,717,458 | B2 | 8/2017 | Lamego et al. |
| 9,724,016 | B1 | 8/2017 | Al-Ali et al. |
| 9,724,024 | B2 | 8/2017 | Al-Ali |
| 9,724,025 | B1 | 8/2017 | Kiani et al. |
| 9,749,232 | B2 | 8/2017 | Sampath et al. |
| 9,750,442 | B2 | 9/2017 | Olsen |
| 9,750,461 | B1 | 9/2017 | Telfort |
| 9,775,545 | B2 | 10/2017 | Al-Ali et al. |
| 9,778,079 | B1 | 10/2017 | Al-Ali et al. |
| 9,782,077 | B2 | 10/2017 | Lamego et al. |
| 9,787,568 | B2 | 10/2017 | Lamego et al. |
| 9,808,188 | B1 | 11/2017 | Perea et al. |
| 9,839,379 | B2 | 12/2017 | Al-Ali et al. |
| 9,839,381 | B1 | 12/2017 | Weber et al. |
| 9,847,749 | B2 | 12/2017 | Kiani et al. |
| 9,848,800 | B1 | 12/2017 | Lee et al. |
| 9,861,298 | B2 | 1/2018 | Eckerbom et al. |
| 9,861,305 | B1 | 1/2018 | Weber et al. |
| 9,877,117 | B2 | 1/2018 | Sabin |

(56) References Cited

U.S. PATENT DOCUMENTS

| | | | | |
|---|---|---|---|---|
| 9,877,650 | B2 | 1/2018 | Muhsin et al. | |
| 9,891,079 | B2 | 2/2018 | Dalvi | |
| 9,894,441 | B2 | 2/2018 | Bang et al. | |
| 9,924,897 | B1 | 3/2018 | Abdul-Hafiz | |
| 9,936,917 | B2 | 4/2018 | Poeze et al. | |
| 9,949,048 | B2 | 4/2018 | Isberg et al. | |
| 9,955,937 | B2 | 5/2018 | Telfort | |
| 9,965,946 | B2 | 5/2018 | Al-Ali et al. | |
| D820,865 | S | 6/2018 | Muhsin et al. | |
| 9,986,952 | B2 | 6/2018 | Dalvi et al. | |
| D822,215 | S | 7/2018 | Al-Ali et al. | |
| D822,216 | S | 7/2018 | Barker et al. | |
| 10,010,276 | B2 | 7/2018 | Al-Ali et al. | |
| 10,051,460 | B2 | 8/2018 | Bran | |
| 10,086,138 | B1 | 10/2018 | Novak, Jr. | |
| 10,111,591 | B2 | 10/2018 | Dyell et al. | |
| D833,624 | S | 11/2018 | DeJong et al. | |
| 10,123,729 | B2 | 11/2018 | Dyell et al. | |
| D835,282 | S | 12/2018 | Barker et al. | |
| D835,283 | S | 12/2018 | Barker et al. | |
| D835,284 | S | 12/2018 | Barker et al. | |
| D835,285 | S | 12/2018 | Barker et al. | |
| 10,149,616 | B2 | 12/2018 | Al-Ali et al. | |
| 10,154,815 | B2 | 12/2018 | Al-Ali et al. | |
| 10,159,412 | B2 | 12/2018 | Lamego et al. | |
| 10,188,348 | B2 | 1/2019 | Al-Ali et al. | |
| RE47,218 | E | 2/2019 | Al-Ali | |
| RE47,244 | E | 2/2019 | Kiani et al. | |
| RE47,249 | E | 2/2019 | Kiani et al. | |
| 10,205,291 | B2 | 2/2019 | Scruggs et al. | |
| 10,226,187 | B2 | 3/2019 | Al-Ali et al. | |
| 10,231,657 | B2 | 3/2019 | Al-Ali et al. | |
| 10,231,670 | B2 | 3/2019 | Blank et al. | |
| RE47,353 | E | 4/2019 | Kiani et al. | |
| 10,279,247 | B2 | 5/2019 | Kiani | |
| 10,292,626 | B2 | 5/2019 | Coninx | |
| 10,292,664 | B2 | 5/2019 | Al-Ali | |
| 10,299,720 | B2 | 5/2019 | Brown et al. | |
| 10,327,337 | B2 | 6/2019 | Schmidt et al. | |
| 10,327,713 | B2 | 6/2019 | Barker et al. | |
| 10,332,630 | B2 | 6/2019 | Al-Ali | |
| 10,383,520 | B2 | 8/2019 | Wojtczuk et al. | |
| 10,383,527 | B2 | 8/2019 | Al-Ali | |
| 10,388,120 | B2 | 8/2019 | Muhsin et al. | |
| D864,120 | S | 10/2019 | Forrest et al. | |
| 10,441,181 | B1 | 10/2019 | Telfort et al. | |
| 10,441,196 | B2 | 10/2019 | Eckerbom et al. | |
| 10,448,844 | B2 | 10/2019 | Al-Ali et al. | |
| 10,448,871 | B2 | 10/2019 | Al-Ali et al. | |
| 10,456,038 | B2 | 10/2019 | Lamego et al. | |
| 10,463,340 | B2 | 11/2019 | Telfort et al. | |
| 10,471,159 | B1 | 11/2019 | Lapotko et al. | |
| 10,505,311 | B2 | 12/2019 | Al-Ali et al. | |
| 10,524,738 | B2 | 1/2020 | Olsen | |
| 10,532,174 | B2 | 1/2020 | Ai-Ali | |
| 10,537,285 | B2 | 1/2020 | Shreim et al. | |
| 10,542,903 | B2 | 1/2020 | Al-Ali et al. | |
| 10,555,678 | B2 | 2/2020 | Dalvi et al. | |
| 10,561,347 | B2 | 2/2020 | Dalhoff et al. | |
| 10,568,553 | B2 | 2/2020 | O'Neil et al. | |
| 10,608,817 | B2 | 3/2020 | Haider et al. | |
| D880,477 | S | 4/2020 | Forrest et al. | |
| 10,617,302 | B2 | 4/2020 | Al-Ali et al. | |
| 10,617,335 | B2 | 4/2020 | Al-Ali et al. | |
| 10,637,181 | B2 | 4/2020 | Al-Ali et al. | |
| D886,849 | S | 6/2020 | Muhsin et al. | |
| D887,548 | S | 6/2020 | Abdul-Hafiz et al. | |
| D887,549 | S | 6/2020 | Abdul-Hafiz et al. | |
| 10,667,764 | B2 | 6/2020 | Ahmed et al. | |
| D890,708 | S | 7/2020 | Forrest et al. | |
| 10,721,785 | B2 | 7/2020 | Al-Ali | |
| 10,736,518 | B2 | 8/2020 | Al-Ali et al. | |
| 10,750,984 | B2 | 8/2020 | Pauley et al. | |
| D897,098 | S | 9/2020 | Al-Ali | |
| 10,779,098 | B2 | 9/2020 | Iswanto et al. | |
| 10,827,961 | B1 | 11/2020 | Iyengar et al. | |
| 10,828,007 | B1 | 11/2020 | Telfort et al. | |
| 10,832,818 | B2 | 11/2020 | Muhsin et al. | |
| 10,849,554 | B2 | 12/2020 | Shreim et al. | |
| 10,856,750 | B2 | 12/2020 | Indorf et al. | |
| D906,970 | S | 1/2021 | Forrest et al. | |
| D908,213 | S | 1/2021 | Abdul-Hafiz et al. | |
| 10,918,281 | B2 | 2/2021 | Al-Ali et al. | |
| 10,932,705 | B2 | 3/2021 | Muhsin et al. | |
| 10,932,729 | B2 | 3/2021 | Kiani et al. | |
| 10,939,878 | B2 | 3/2021 | Kiani et al. | |
| 10,956,950 | B2 | 3/2021 | Al-Ali et al. | |
| D916,135 | S | 4/2021 | Indorf et al. | |
| D917,046 | S | 4/2021 | Abdul-Hafiz et al. | |
| D917,550 | S | 4/2021 | Indorf et al. | |
| D917,564 | S | 4/2021 | Indorf et al. | |
| D917,704 | S | 4/2021 | Al-Ali et al. | |
| 10,979,836 | B2 | 4/2021 | Usher et al. | |
| 10,987,066 | B2 | 4/2021 | Chandran et al. | |
| 10,991,135 | B2 | 4/2021 | Al-Ali et al. | |
| D919,094 | S | 5/2021 | Al-Ali et al. | |
| D919,100 | S | 5/2021 | Al-Ali et al. | |
| 11,006,225 | B2 | 5/2021 | Greenberg et al. | |
| 11,006,867 | B2 | 5/2021 | Al-Ali | |
| D921,202 | S | 6/2021 | Al-Ali et al. | |
| 11,024,064 | B2 | 6/2021 | Muhsin et al. | |
| 11,024,421 | B2 | 6/2021 | Dalhoff et al. | |
| 11,026,604 | B2 | 6/2021 | Chen et al. | |
| D925,597 | S | 7/2021 | Chandran et al. | |
| D927,699 | S | 8/2021 | Al-Ali et al. | |
| 11,076,777 | B2 | 8/2021 | Lee et al. | |
| 11,114,188 | B2 | 9/2021 | Poeze et al. | |
| D933,232 | S | 10/2021 | Al-Ali et al. | |
| D933,233 | S | 10/2021 | Al-Ali et al. | |
| D933,234 | S | 10/2021 | Al-Ali et al. | |
| 11,144,646 | B2 | 10/2021 | Maretti et al. | |
| 11,145,408 | B2 | 10/2021 | Sampath et al. | |
| 11,147,518 | B1 | 10/2021 | Al-Ali et al. | |
| 11,185,262 | B2 | 11/2021 | Al-Ali et al. | |
| 11,191,484 | B2 | 12/2021 | Kiani et al. | |
| 11,202,159 | B2 | 12/2021 | Boley et al. | |
| D946,596 | S | 3/2022 | Ahmed | |
| D946,597 | S | 3/2022 | Ahmed | |
| D946,598 | S | 3/2022 | Ahmed | |
| D946,617 | S | 3/2022 | Ahmed | |
| 11,272,839 | B2 | 3/2022 | Al-Ali et al. | |
| 11,289,199 | B2 | 3/2022 | Ai-Ali | |
| RE49,034 | E | 4/2022 | Ai-Ali | |
| 11,298,021 | B2 | 4/2022 | Muhsin et al. | |
| D950,580 | S | 5/2022 | Ahmed | |
| D950,599 | S | 5/2022 | Ahmed | |
| D950,738 | S | 5/2022 | Al-Ali et al. | |
| D957,648 | S | 7/2022 | Al-Ali | |
| 11,382,567 | B2 | 7/2022 | O'Brien et al. | |
| 11,389,093 | B2 | 7/2022 | Triman et al. | |
| 11,406,286 | B2 | 8/2022 | Al-Ali et al. | |
| 11,417,426 | B2 | 8/2022 | Muhsin et al. | |
| 11,439,329 | B2 | 9/2022 | Lamego | |
| 11,445,948 | B2 | 9/2022 | Scruggs et al. | |
| D965,789 | S | 10/2022 | Al-Ali et al. | |
| D967,433 | S | 10/2022 | Al-Ali et al. | |
| 11,464,410 | B2 | 10/2022 | Muhsin | |
| 11,504,058 | B1 | 11/2022 | Sharma et al. | |
| 11,504,066 | B1 | 11/2022 | Dalvi et al. | |
| D971,933 | S | 12/2022 | Ahmed | |
| D973,072 | S | 12/2022 | Ahmed | |
| D973,685 | S | 12/2022 | Ahmed | |
| D973,686 | S | 12/2022 | Ahmed | |
| D974,193 | S | 1/2023 | Forrest et al. | |
| D979,516 | S | 2/2023 | Al-Ali et al. | |
| D980,091 | S | 3/2023 | Forrest et al. | |
| 11,596,363 | B2 | 3/2023 | Lamego | |
| 11,615,803 | B2 * | 3/2023 | Harvey .................. | A61B 5/117 381/56 |
| 11,627,919 | B2 | 4/2023 | Kiani et al. | |
| 11,637,437 | B2 | 4/2023 | Al-Ali et al. | |
| D985,498 | S | 5/2023 | Al-Ali et al. | |
| 11,653,862 | B2 | 5/2023 | Dalvi et al. | |
| D989,112 | S | 6/2023 | Muhsin et al. | |

(56) References Cited

U.S. PATENT DOCUMENTS

| | | | |
|---|---|---|---|
| D989,327 S | 6/2023 | Al-Ali et al. | |
| 11,678,829 B2 | 6/2023 | Al-Ali et al. | |
| 11,679,579 B2 | 6/2023 | Al-Ali | |
| 11,684,296 B2 | 6/2023 | Vo et al. | |
| 11,692,934 B2 | 7/2023 | Normand et al. | |
| 11,701,043 B2 | 7/2023 | Al-Ali et al. | |
| D997,365 S | 8/2023 | Hwang | |
| 11,721,105 B2 | 8/2023 | Ranasinghe et al. | |
| 11,730,379 B2 | 8/2023 | Ahmed et al. | |
| D998,625 S | 9/2023 | Indorf et al. | |
| D998,630 S | 9/2023 | Indorf et al. | |
| D998,631 S | 9/2023 | Indorf et al. | |
| D999,244 S | 9/2023 | Indorf et al. | |
| D999,245 S | 9/2023 | Indorf et al. | |
| D999,246 S | 9/2023 | Indorf et al. | |
| 11,766,198 B2 | 9/2023 | Pauley et al. | |
| D1,000,975 S | 10/2023 | Al-Ali et al. | |
| 11,803,623 B2 | 10/2023 | Kiani et al. | |
| 11,832,940 B2 | 12/2023 | Diab et al. | |
| D1,013,179 S | 1/2024 | Al-Ali et al. | |
| 11,872,156 B2 | 1/2024 | Telfort et al. | |
| 11,879,960 B2 | 1/2024 | Ranasinghe et al. | |
| 11,883,129 B2 | 1/2024 | Olsen | |
| D1,022,729 S | 4/2024 | Forrest et al. | |
| 11,951,186 B2 | 4/2024 | Krishnamani et al. | |
| 11,974,833 B2 | 5/2024 | Forrest et al. | |
| 11,986,067 B2 | 5/2024 | Al-Ali et al. | |
| 11,986,289 B2 | 5/2024 | Dalvi et al. | |
| 11,986,305 B2 | 5/2024 | Al-Ali et al. | |
| 2001/0034477 A1 | 10/2001 | Mansfield et al. | |
| 2001/0039483 A1 | 11/2001 | Brand et al. | |
| 2002/0010401 A1 | 1/2002 | Bushmakin et al. | |
| 2002/0058864 A1 | 5/2002 | Mansfield et al. | |
| 2002/0133080 A1 | 9/2002 | Apruzzese et al. | |
| 2003/0013975 A1 | 1/2003 | Kiani | |
| 2003/0018243 A1 | 1/2003 | Gerhardt et al. | |
| 2003/0144582 A1 | 7/2003 | Cohen et al. | |
| 2003/0156288 A1 | 8/2003 | Barnum et al. | |
| 2003/0212312 A1 | 11/2003 | Coffin, IV et al. | |
| 2004/0106163 A1 | 6/2004 | Workman, Jr. et al. | |
| 2005/0055276 A1 | 3/2005 | Kiani et al. | |
| 2005/0234317 A1 | 10/2005 | Kiani | |
| 2006/0073719 A1 | 4/2006 | Kiani | |
| 2006/0189871 A1 | 8/2006 | Al-Ali et al. | |
| 2007/0073116 A1 | 3/2007 | Kiani et al. | |
| 2007/0180140 A1 | 8/2007 | Welch et al. | |
| 2007/0244377 A1 | 10/2007 | Cozad et al. | |
| 2008/0064965 A1 | 3/2008 | Jay et al. | |
| 2008/0094228 A1 | 4/2008 | Welch et al. | |
| 2008/0103375 A1 | 5/2008 | Kiani | |
| 2008/0219486 A1* | 9/2008 | Goldstein | H04R 1/1016 381/312 |
| 2008/0221418 A1 | 9/2008 | Al-Ali et al. | |
| 2008/0285780 A1 | 11/2008 | Aarts | |
| 2009/0036759 A1 | 2/2009 | Ault et al. | |
| 2009/0093687 A1 | 4/2009 | Telfort et al. | |
| 2009/0095926 A1 | 4/2009 | MacNeish, III | |
| 2009/0247984 A1 | 10/2009 | Lamego et al. | |
| 2009/0275844 A1 | 11/2009 | Al-Ali | |
| 2010/0004518 A1 | 1/2010 | Vo et al. | |
| 2010/0030040 A1 | 2/2010 | Poeze et al. | |
| 2010/0099964 A1 | 4/2010 | O'Reilly et al. | |
| 2010/0234718 A1 | 9/2010 | Sampath et al. | |
| 2010/0270257 A1 | 10/2010 | Wachman et al. | |
| 2011/0028806 A1 | 2/2011 | Merritt et al. | |
| 2011/0028809 A1 | 2/2011 | Goodman | |
| 2011/0040197 A1 | 2/2011 | Welch et al. | |
| 2011/0082711 A1 | 4/2011 | Poeze et al. | |
| 2011/0087081 A1 | 4/2011 | Kiani et al. | |
| 2011/0118561 A1 | 5/2011 | Tari et al. | |
| 2011/0137297 A1 | 6/2011 | Kiani et al. | |
| 2011/0172498 A1 | 7/2011 | Olsen et al. | |
| 2012/0095749 A1 | 4/2012 | Capretta | |
| 2012/0123231 A1 | 5/2012 | O'Reilly | |
| 2012/0165629 A1 | 6/2012 | Merritt et al. | |
| 2012/0209084 A1 | 8/2012 | Olsen et al. | |
| 2012/0226117 A1 | 9/2012 | Lamego et al. | |
| 2012/0283524 A1 | 11/2012 | Kiani et al. | |
| 2013/0023775 A1 | 1/2013 | Lamego et al. | |
| 2013/0060147 A1 | 3/2013 | Welch et al. | |
| 2013/0096405 A1 | 4/2013 | Garfio | |
| 2013/0216052 A1 | 8/2013 | Bruss et al. | |
| 2013/0296672 A1 | 11/2013 | O'Neil et al. | |
| 2013/0345921 A1 | 12/2013 | Al-Ali et al. | |
| 2014/0166076 A1 | 6/2014 | Kiani et al. | |
| 2014/0180160 A1 | 6/2014 | Brown et al. | |
| 2014/0187973 A1 | 7/2014 | Brown et al. | |
| 2014/0275871 A1 | 9/2014 | Lamego et al. | |
| 2014/0275872 A1 | 9/2014 | Merritt et al. | |
| 2014/0316217 A1 | 10/2014 | Purdon et al. | |
| 2014/0316218 A1 | 10/2014 | Purdon et al. | |
| 2014/0323897 A1 | 10/2014 | Brown et al. | |
| 2014/0323898 A1 | 10/2014 | Purdon et al. | |
| 2015/0005600 A1 | 1/2015 | Blank et al. | |
| 2015/0011907 A1 | 1/2015 | Purdon et al. | |
| 2015/0073241 A1 | 3/2015 | Lamego | |
| 2015/0080754 A1 | 3/2015 | Purdon et al. | |
| 2015/0099950 A1 | 4/2015 | Al-Ali et al. | |
| 2017/0024748 A1 | 1/2017 | Haider | |
| 2017/0251974 A1 | 9/2017 | Shreim et al. | |
| 2018/0124527 A1 | 5/2018 | El-Hoiydi et al. | |
| 2018/0247712 A1 | 8/2018 | Muhsin et al. | |
| 2018/0324516 A1* | 11/2018 | Campbell | H04R 1/1091 |
| 2019/0076058 A1 | 3/2019 | Piechowiak et al. | |
| 2019/0159702 A1 | 5/2019 | Charaziak et al. | |
| 2020/0111552 A1 | 4/2020 | Ahmed | |
| 2020/0113520 A1 | 4/2020 | Abdul-Hafiz et al. | |
| 2020/0138368 A1 | 5/2020 | Kiani et al. | |
| 2020/0196977 A1 | 6/2020 | Martin et al. | |
| 2020/0253474 A1 | 8/2020 | Muhsin et al. | |
| 2020/0253544 A1 | 8/2020 | Belur Nagaraj et al. | |
| 2020/0268288 A1 | 8/2020 | Dalhoff et al. | |
| 2020/0275841 A1 | 9/2020 | Telfort et al. | |
| 2020/0288983 A1 | 9/2020 | Telfort et al. | |
| 2020/0329993 A1 | 10/2020 | Al-Ali et al. | |
| 2021/0022628 A1 | 1/2021 | Telfort et al. | |
| 2021/0104173 A1 | 4/2021 | Pauley et al. | |
| 2021/0117525 A1 | 4/2021 | Kiani et al. | |
| 2021/0161465 A1 | 6/2021 | Barker et al. | |
| 2021/0236729 A1 | 8/2021 | Kiani et al. | |
| 2021/0259560 A1* | 8/2021 | Venkatraman | A61B 5/024 |
| 2021/0275101 A1 | 9/2021 | Vo et al. | |
| 2021/0290080 A1 | 9/2021 | Ahmed | |
| 2021/0290120 A1 | 9/2021 | Al-Ali | |
| 2021/0290177 A1 | 9/2021 | Novak, Jr. | |
| 2021/0290184 A1 | 9/2021 | Ahmed | |
| 2021/0296008 A1 | 9/2021 | Novak, Jr. | |
| 2021/0330228 A1 | 10/2021 | Olsen et al. | |
| 2021/0386382 A1 | 12/2021 | Olsen et al. | |
| 2021/0402110 A1 | 12/2021 | Pauley et al. | |
| 2022/0039707 A1 | 2/2022 | Sharma et al. | |
| 2022/0071562 A1 | 3/2022 | Kiani | |
| 2022/0096603 A1 | 3/2022 | Kiani et al. | |
| 2022/0151521 A1 | 5/2022 | Krishnamani et al. | |
| 2022/0218244 A1 | 7/2022 | Kiani et al. | |
| 2022/0287574 A1 | 9/2022 | Telfort et al. | |
| 2022/0296161 A1 | 9/2022 | Al-Ali et al. | |
| 2022/0361819 A1 | 11/2022 | Al-Ali et al. | |
| 2022/0379059 A1 | 12/2022 | Yu et al. | |
| 2022/0392610 A1 | 12/2022 | Kiani et al. | |
| 2023/0028745 A1 | 1/2023 | Al-Ali | |
| 2023/0038389 A1 | 2/2023 | Vo | |
| 2023/0045647 A1 | 2/2023 | Vo | |
| 2023/0058052 A1 | 2/2023 | Al-Ali | |
| 2023/0058342 A1 | 2/2023 | Kiani | |
| 2023/0069789 A1 | 3/2023 | Koo et al. | |
| 2023/0087671 A1 | 3/2023 | Telfort et al. | |
| 2023/0110152 A1 | 4/2023 | Forrest et al. | |
| 2023/0111198 A1 | 4/2023 | Yu et al. | |
| 2023/0115397 A1 | 4/2023 | Vo et al. | |
| 2023/0116371 A1 | 4/2023 | Mills et al. | |
| 2023/0135297 A1 | 5/2023 | Kiani et al. | |
| 2023/0138098 A1 | 5/2023 | Telfort et al. | |
| 2023/0145155 A1 | 5/2023 | Krishnamani et al. | |

(56) References Cited

U.S. PATENT DOCUMENTS

| | | | |
|---|---|---|---|
| 2023/0147750 | A1 | 5/2023 | Barker et al. |
| 2023/0210417 | A1 | 7/2023 | Al-Ali et al. |
| 2023/0222805 | A1 | 7/2023 | Muhsin et al. |
| 2023/0222887 | A1 | 7/2023 | Muhsin et al. |
| 2023/0226331 | A1 | 7/2023 | Kiani et al. |
| 2023/0284916 | A1 | 9/2023 | Telfort |
| 2023/0284943 | A1 | 9/2023 | Scruggs et al. |
| 2023/0301562 | A1 | 9/2023 | Scruggs et al. |
| 2023/0346993 | A1 | 11/2023 | Kiani et al. |
| 2023/0368221 | A1 | 11/2023 | Haider |
| 2023/0371893 | A1 | 11/2023 | Al-Ali et al. |
| 2023/0389837 | A1 | 12/2023 | Krishnamani et al. |
| 2024/0016418 | A1 | 1/2024 | Devadoss et al. |
| 2024/0016419 | A1 | 1/2024 | Devadoss et al. |
| 2024/0047061 | A1 | 2/2024 | Al-Ali et al. |
| 2024/0049310 | A1 | 2/2024 | Al-Ali et al. |
| 2024/0049986 | A1 | 2/2024 | Al-Ali et al. |
| 2024/0081656 | A1 | 3/2024 | DeJong et al. |
| 2024/0122486 | A1 | 4/2024 | Kiani |
| 2024/0180456 | A1 | 6/2024 | Al-Ali |

* cited by examiner

AUDITORY HEALTH MONITORING SYSTEM WITH AURICULAR DEVICE AND PHYSIOLOGICAL SENSOR

CROSS REFERENCE TO RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to the field of physiological monitoring.

BACKGROUND

Auricular devices, such as earbuds, can be worn in a user's ear and can emit audio into the user's ear. Such audio emitted from an auricular device can include audio playback, such as music, for the user's enjoyment and can also include audio that is part of an auditory diagnostic assessment. Otoacoustic emissions emanating from a user's inner ear can be detected to analyze the user's auditory health. The quality of otoacoustic emissions can be corrupted by noise including noise originating from physiological processes occurring within the user's body such as cardiac activity, respiratory activity, and digestive tract activity. An inner ear's ability to generate consistent otoacoustic emissions can be affected by physiological changes such as changes in blood oxygen saturation, changes in body temperature, and changes in intracranial pressure.

SUMMARY

Disclosed herein is a system for monitoring auditory health of a user. The system can comprise and auricular device and one or more hardware processors associated with the auricular device. The auricular device can comprise a microphone oriented toward an inner ear of the user when the auricular device is worn by the user and configured to generate OAE audio data responsive to detecting one or more otoacoustic emissions originating from the inner ear of the user. The one or more hardware processors can be configured to: access the OAE audio data originating from the microphone; access physiological data of the user originating from a physiological sensor coupled to the user; detect a feature of the physiological data in a time-domain based on a value of the physiological data exceeding a threshold, the feature of the physiological data corresponding to a physiological event generating noise during the one or more otoacoustic emissions, the noise having a noise frequency within a threshold of an OAE frequency of the one or more otoacoustic emissions; adjust a portion of the OAE audio data responsive to detecting the feature of the physiological data to reduce interference of the noise from the physiological event on the OAE audio data, the portion of the OAE audio data corresponding to the feature of the physiological data in the time-domain; and determine one or more physiological characteristics of the user based on the OAE audio data.

In some implementations, the physiological data includes one or more of PPG data originating from an optical sensor or ECG data originating from an ECG sensor comprising an electrode.

In some implementations, the one or more hardware processors are configured to: generate one or more waveforms from the physiological data including an ECG waveform, a respiration waveform, or a pulse waveform; and determine the feature of the physiological data from the one or more waveforms.

In some implementations, the auricular device further comprises a speaker configured to emit an audio stimulus toward the inner ear of the user, the audio stimulus configured to evoke the one or more otoacoustic emissions, wherein the one or more hardware processors are configured to adjust an operation of the speaker based on the physiological data to control the one or more otoacoustic emissions.

In some implementations, adjusting the operation of the speaker includes adjusting a time the speaker emits the audio stimulus to avoid evoking the one or more otoacoustic emissions during the physiological event.

In some implementations, adjusting the operation of the speaker includes adjusting a stimulus frequency of the audio stimulus to adjust the OAE frequency of the one or more otoacoustic emissions to avoid interference with the noise from the physiological event.

In some implementations, adjusting the operation of the speaker includes adjusting a stimulus amplitude of the audio stimulus to evoke the one or more otoacoustic emissions with an OAE amplitude being greater than a noise amplitude of the noise from the physiological event.

In some implementations, the one or more hardware processors are configured to: estimate a future physiological event based on the physiological data; and adjust the operation of the speaker based on the estimated future physiological event.

In some implementations, adjusting the portion of the OAE audio data includes discarding one or more values of the OAE audio data.

In some implementations, adjusting the portion of the OAE audio data includes assigning one or more weights to the OAE audio data.

In some implementations, adjusting the portion of the OAE audio data includes binning the OAE audio data.

In some implementations, the physiological sensor is integrated with the auricular device.

In some implementations, the one or more physiological characteristics of the user includes a hearing sensitivity of the user.

In some implementations, the one or more physiological characteristics of the user includes an oxygenation of the user.

In some implementations, the one or more physiological characteristics of the user includes an intracranial pressure of the user.

In some implementations, the one or more hardware processors are configured to generate a hearing transfer function from the OAE audio data to implement user-specific audio playback.

Disclosed herein is a system for monitoring auditory health of a user. The system can comprise an auricular device comprising: an internal microphone oriented toward an inner ear of the user when the auricular device is worn by the user and configured to generate OAE audio data responsive to detecting one or more otoacoustic emissions originating from the inner ear of the user; an external microphone oriented away from the user when the auricular device is worn by the user and configured to generate external audio data responsive to detecting external audio originating from outside the user's body; and an inertial sensor configured to generate internal audio data responsive to detecting internal audio conducted through the user's body. The system can further comprise one or more hardware processors associated with the auricular device configured to: access the OAE audio data originating from the internal microphone; access the external audio data originating from the external microphone; access the internal audio data originating from the inertial sensor; determine an adaptive filter based on the external audio data and the internal audio data; suppress noise from the OAE audio data based on the adaptive filter, the noise comprising the internal audio or the external audio; and determine one or more physiological characteristics of the user based on the OAE audio data.

In some implementations, the one or more hardware processors are configured to suppress the noise from the OAE audio data by applying a filter to the OAE audio data.

In some implementations, the filter includes a high pass filter.

In some implementations, the inertial sensor includes a vibration sensor.

In some implementations, the inertial sensor includes a bone conduction microphone.

In some implementations, the one or more physiological characteristics of the user includes a hearing sensitivity of the user.

In some implementations, the one or more physiological characteristics of the user includes an oxygenation of the user.

In some implementations, the one or more physiological characteristics of the user includes an intracranial pressure of the user.

In some implementations, the one or more hardware processors are configured to generate a hearing transfer function from the OAE audio data to implement user-specific audio playback.

In some implementations, the one or more hardware processors are configured to determine the adaptive filter based on determining one or more of a transfer function, a frequency response, and/or an impulse response.

In some implementations, the one or more hardware processors are configured to select the adaptive filter from predetermined filters based on a decibel level of the internal audio data and a decibel level of the external audio data.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

Various implementations will be described hereinafter with reference to the accompanying drawings. These implementations are illustrated and described by example only, and are not intended to limit the scope of the disclosure. In the drawings, similar elements may have similar reference numerals.

DETAILED DESCRIPTION

The present disclosure will now be described with reference to the accompanying figures, wherein like numerals may refer to like elements throughout. The following description is merely illustrative in nature and is in no way intended to limit the disclosure, its application, or uses. It should be understood that steps within a method may be executed in different order without altering the principles of the present disclosure. Furthermore, the devices, systems, and/or methods disclosed herein can include several novel features, no single one of which is solely responsible for its desirable attributes or which is essential to practicing the devices, systems, and/or methods disclosed herein. Additionally, the structures, systems, and/or devices described herein may be embodied as integrated components or as separate components.

Figure 1:
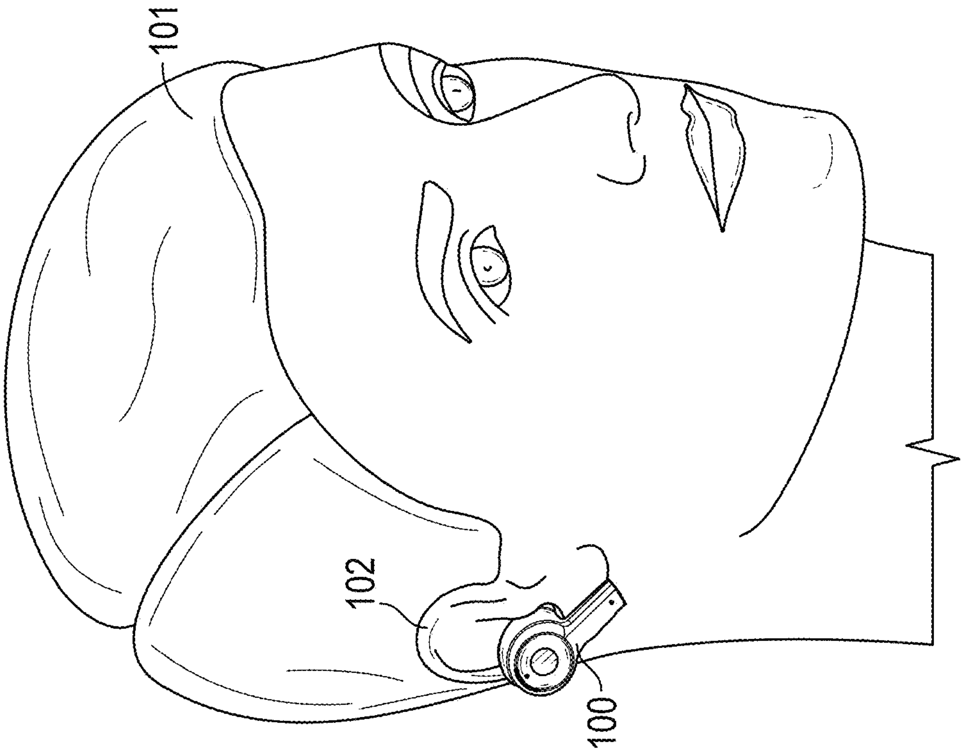
FIG. 1 illustrates an example auricular device worn by a user.

FIG. 1 illustrates an example auricular device 100 secured to an ear 102 of a user 101 (which may also be referred to as a "subject", "wearer," or "patient"). The auricular device 100 can be secured to any of a number of portions and/or locations relative to the ear 102. For example, the auricular device 100 can be secured to, placed adjacent, and/or positioned to be in contact with a pinna, a concha, an ear canal, a tragus, an antitragus, a helix, an antihelix, and/or another portion of the ear 102. In some implementations, the auricular device 100 may be an over-the-ear earcup or headphone. In some implementations, the auricular device 100 may be a hearing aid. In some implementations, the auricular device 100 may be an earbud. In some implementations, two auricular devices 100 can be secured to two cars of the user 101 (one per each ear). The user 101 may be a newborn baby. The auricular device 100 may be used during a diagnostic assessment of acoustic function of the user 101.

Any of the auricular devices described herein and/or components and/or features of the auricular devices described herein can be integrated into a wearable device that secures to another portion of a user's body. For example, any of the components and/or features of the auricular devices described herein can be integrated into a wearable device that can be secured to a head, chest, neck, leg, ankle, wrist, or another portion of the body. As another example, any of the components and/or features of the auricular devices described herein can be integrated into glasses and/or sunglasses that a user can wear. As another example, any of the components and/or features of the auricular devices described herein can be integrated into a device (for example, a band) that that a user can wear around their neck.

Figure 2:
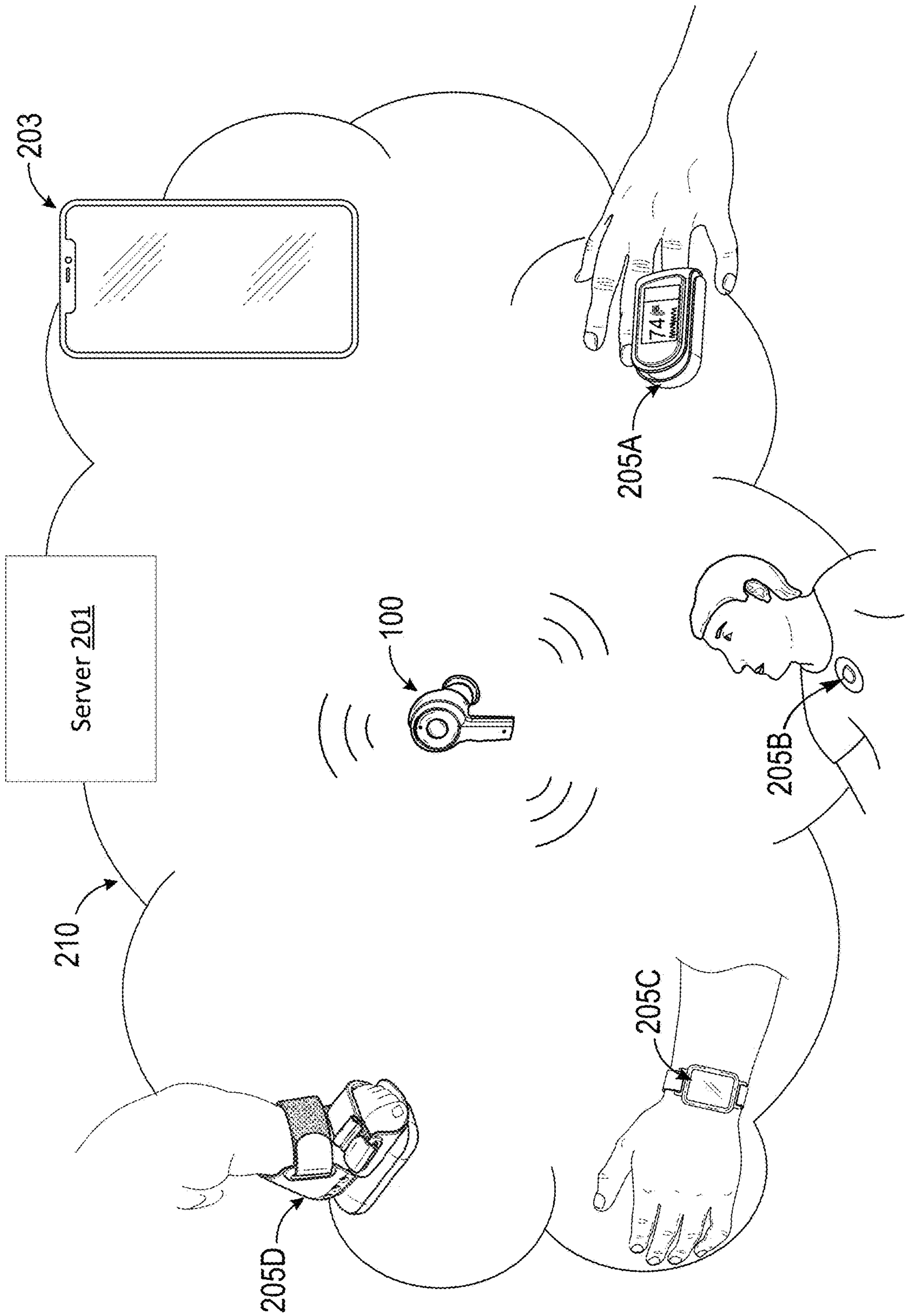
FIG. 2 illustrates an example implementation of an auricular device in communication with various other devices in a network.

FIG. 2 illustrates an example implementation of the auricular device 100 in communication with various other devices and/or systems over network 210. The network 210 can include one or more communications networks. The network 210 can include a plurality of computing devices configured to communicate with one another. The network 210 can include the Internet. The network 210 can include a cellular network. The network 210 can include any combination of a body area network (e.g., implementing human body communication with capacitive coupling via the tissue of a user's body), a local area network ("LAN") and/or a wide area network ("WAN"), or the like. Accordingly, various computing devices can communicate with one another directly or indirectly via any appropriate communications links and/or networks, such as network 210 (e.g., one or more communications links, one or more computer networks, one or more wired or wireless connections, the Internet, any combination of the foregoing, and/or the like).

Communication over the network 210 can include a variety of communication protocols, including wired communication, wireless communication, wire-like communication, near-field communication (such as inductive coupling between coils of wire or capacitive coupling between conductive electrodes), and far-field communication (such as transferring energy via electromagnetic radiation (e.g., radio waves)). Example communication protocols can include Wi-Fi, Bluetooth®, ZigBee®, Z-wave®, cellular telephony, such as long-term evolution (LTE) and/or 1G, 2G, 3G, 4G, 5G, etc., infrared, radio frequency identification (RFID), satellite transmission, inductive coupling, capacitive coupling, proprietary protocols, combinations of the same, and the like.

The auricular device 100 can communicate with a server 201. The server 201 can comprise one or more computing devices including one or more hardware processors. The server 201 can comprise program instructions configured to cause the server 201 to perform one or more operations when executed by the hardware processors. The server 201 can include, and/or have access to (e.g., be in communication with and/or host) a storage device, database, or system which can include any computer readable storage medium and/or device (or collection of data storage mediums and/or devices), including, but not limited to, one or more memory devices that store data, including without limitation, dynamic and/or static random-access memory (RAM), programmable read-only memory (PROM), erasable programmable read-only memory (EPROM), electrically erasable programmable read-only memory (EEPROM), optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. In some implementations, the server 201 can include and/or be in communication with a hosted storage environment that includes a collection of physical data storage devices that may be remotely accessible and may be rapidly provisioned as needed (commonly referred to as "cloud" storage). Data stored in and/or accessible by the server 201 can include physiological data and/or audio data. In some implementations, the server 201 can comprise and/or be in communication with an electronic medical records (EMR). An EMR can comprise a propriety EMR. An EMR can comprise an EMR associated with a hospital. An EMR can store data including medical records.

The auricular device 100 can communicate with an electronic device 203. The electronic device 203 may be a smartphone or other mobile device such as a tablet, a PDA, a computer, a laptop, or the like.

The auricular device 100 can communicate with one or more physiological sensor devices such as a finger-worn sensor device 205A, a chest-worn sensor device 205B, a wrist-worn sensor device 205C which may be a smartwatch, and foot-worn sensor device 205D. Any of the physiological sensor devices 205A-205D can include one or more physiological sensors configured to generate physiological data of physiological parameters. Such sensors can include acoustic sensors, optical sensors, inertial sensors, temperatures sensors, electrical sensors, voltage sensors, impedance sensors, etc. Such sensors can include an oximeter. Such sensors can include a photoplethysmography (PPG) sensor configured to measure volumetric variations in blood circulation and derive one or more parameters therefrom, such as pulse rate, blood pressure, respiration rate, cardiac output, perfusion index, pleth variability index, PPG waveform data, blood oxygen saturation, etc. Such sensors can include one or more optical emitters configured to emit optical radiation of a plurality of wavelengths, which can include visible light. Such sensors can include one or more optical detectors configured to detect optical radiation attenuated by the tissue of subject (which may have been emitted by optical emitters) and generate data relating to the pulsatile characteristics of the subject, including blood oxygen saturation, hydration, hemoglobin content, etc. Such sensors can include electrocardiogram (ECG) sensors, including one or more electrodes, configured to measure electrical activity of the subject, such as cardiac signals. Such sensors can include electroencephalography (EEG) sensors. Such sensors can measure and/or generate data relating to respiration rate, blood oxygen saturation (e.g., SpO2), heart rate, pulse rate, skin temperature, core body temperature, spatial orientation, or the like. Such sensors can include inertial sensors (e.g., accelerometer and/or gyroscope) configured to measure linear and/or angular acceleration indicative of a motion and/or posture of a subject. Such sensors can include temperature sensors (e.g., thermistor, infrared temperature sensor) configured to measure temperature of a subject such as skin surface temperature and/or core body temperature.

The auricular device 100 can be configured to transmit and/or receive data over the network 210, such as physiological data of a user, audio playback data, audiometry data, or the like. For example, the auricular device 100 can receive physiological data from any of the physiological sensor devices 205A-205D. As another example, the auricular device 100 can receive instructions or information associated with employing an audio playback mode or hearing aid mode or in utilizing a particular hearing transfer function from the server 201, electronic device 203, and/or the wrist-worn sensor device 205C.

Figure 3:
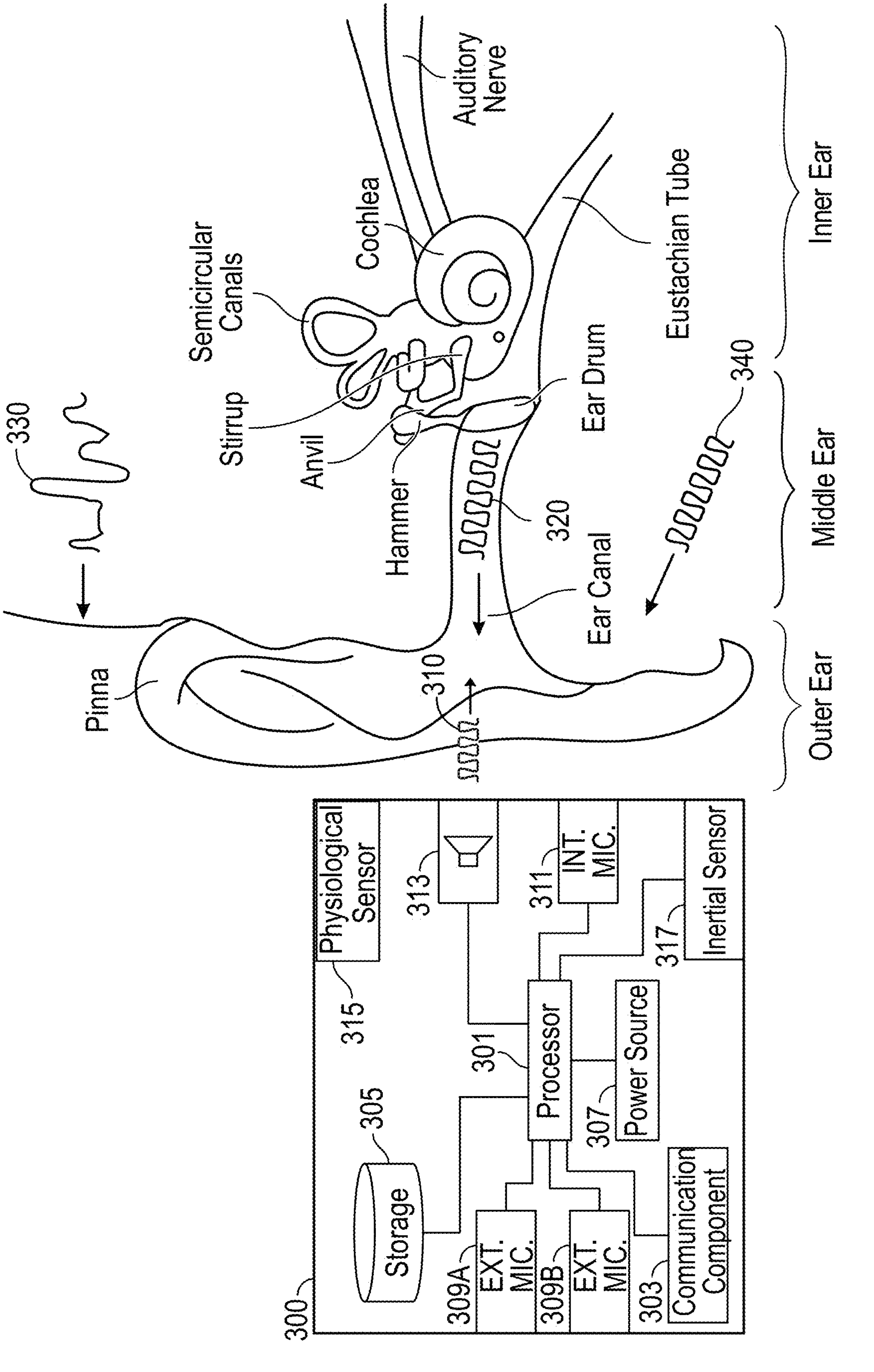
FIG. 3 is a block diagram illustrating an example implementation of a physiological monitoring system with an auricular device.

FIG. 3 illustrates a block diagram of an example auricular device 300 implemented with a user's ear. Various emissions can be generated within a user in response to an audio stimulus 310. For example, the user's auditory system can generate an otoacoustic emission (OAE) 320 and/or electrical signal 330 responsive to audio stimulus 310 being introduced to the user's car. The cochlea can generate the OAE 320. In some implementations, the cochlea can generate the OAE 320 spontaneously without an audio stimulus. The OAE 320 can include one or more of a distortion product otoacoustic emission (DP-OAE), a spontaneous otoacoustic emission (S-OAE), and/or a transient evoked otoacoustic emission (TE-OAE).

The electrical signal 330 can include an electrical voltage originating from the user's inner ear and/or brain (e.g., the auditory nerve) in response to audio stimulus 310. The electrical signal 330 can be an auditory evoked potential (AEP). The electrical signal 330 can be measured with one or more physiological sensors such as electrodes to generate audiometry data, such as auditory brainstem response (ABR) data, mid-latency response data, cortical response data, acoustic change complex data, auditory steady state response (ASSR) data, complex auditory brainstem response data, electrocochleography (ECoG) data, cochlear microphonic data, cochlear neurophonic AEPs data, electroencephalography (EEG) data, or the like. The electrical signal 330 can be measured by one or more sensors placed on the scalp or skin of the user.

The auricular device 300 can be an earpiece such as a hearing aid, a wired earbud, a wireless earbud, and an earpiece integrated into an earcup, an osseointegrated auditory prosthesis, a cochlear implant, etc. The auricular device 300 can include a hardware processor 301, a communication component 303, storage 305, a power source 307, one or more external microphones 309, an internal microphone 311, one or more speakers 313, one or more physiological sensors 315, and an inertial sensor 317. In some implementations, the auricular device 300 may include less than all of the components shown in FIG. 3. For example, the auricular device 300 may not include an external microphone 309. In some implementations, the auricular device 300 can include multiple components of a single component shown. For example, the auricular device 300 can include a plurality of speakers 313 and/or internal microphones 311. The auricular device 200 can comprise one or more components as a single integrated unit, such as within a housing of the auricular device 200. In some implementations, one or more components may be remote the auricular device 300. For example, one or more of the physiological sensors 315 can be embodied in a separate device remote to the auricular device 300, such as any of the example physiological sensor devices 205A-205D shown and/or described herein.

The hardware processor 301 can comprise one or more integrated circuits. The hardware processor 301 can comprise and/or have access to memory. The hardware processor 301 can comprise and/or be embodied as one or more chips, controllers such as microcontrollers (MCUs), and/or microprocessors (MPUs). The hardware processor 301 can comprise a central processing unit (CPU). In some implementations, the hardware processor 301 can be embodied as a system-on-a-chip (SoC). The hardware processor 301 can be configured to implement an operating system which can allow multiple processes to execute simultaneously. The hardware processor 301 can be configured to execute program instructions to cause the auricular device 300 to perform one or more operations. The hardware processor 301 can be configured, among other things, to process data, execute instructions to perform one or more functions, and/or control the operation of the auricular device 300 or components thereof. For example, the hardware processor 301 can process physiological data obtained from physiological sensors and can execute instructions to perform functions related to storing and/or transmitting such physiological data. In some implementations, the hardware processor 301 can be remote to the auricular device 300. The hardware processor 301 can receive and process data that was collected by the external microphone 309, the internal microphone 311, the inertial sensor 317 and/or the physiological sensor 315. The hardware processor 301 can access data as it is generated in real-time and/or can access data stored in storage 305, such as historical data previously generated.

The hardware processor 301 can execute one or more processes to monitor an auditory health of a user. The hardware processor 301 can generate audiometry data of a user, such as by playing an input audio signal comprising varying amplitudes at a single frequency. The input audio signal can include a test audio signal, and/or a content audio signal comprising music, speech, environment sounds, animal sounds, etc. For example, the input audio signal can include the content audio signal with an embedded test audio signal. The hardware processor 301 can continue to refine audiometry data associated with a user (e.g., auditory profile), as the user continues to listen to audio.

The hardware processor 301 can implement one or more audiometry tests to assess the operation of an inner ear of a user which may indicate an auditory health of the user. The hardware processor 301 can implement an otoacoustic emissions (OAE) test, such as a stimulus frequency OAE test, swept-tone OAE test, transient evoked OAE test, distortion product OAE test, or pulsed OAE test. The hardware processor 301 can access audio data originating from microphones (e.g., internal microphone 311) to measure otoacoustic emissions (OAE) from the user's ear (e.g., in the external car canal). The hardware processor 301 can process the OAE audio data from the microphones (e.g., internal microphone 311 during an audiometric test) to generate audiometry data (e.g., processed OAE audio data and/or stimulus audio data). As an example, the hardware processor 301 can determine and/or generate any of the audiometry data represented in the graphs of FIGS. 5A-5C.

The hardware processor 301 can determine a user's hearing transfer function based on audiometry data. For example, the hardware processor 301 can compare the measured OAEs with response ranges from normal-hearing subjects and impaired-hearing subjects to develop the frequency dependent hearing transfer function for each car of the user. A hearing transfer function can correlate an actual amplitude or intensity of sound produced by an audio signal to a user-perceived amplitude or intensity. A hearing transfer function can correlate actual amplitudes or intensities to user-perceived amplitudes or intensities for given frequencies of an audio signal. As an example, a hearing transfer function can indicate that an input audio signal that produces a sound at 1000 Hz at 70 dB, is perceived by the user as being at 25 dB. A hearing transfer function can include data to facilitate achieving a certain audio output for a given audio input. For example, the hearing transfer function can include data relating to filters, gain, suppression, phase shift, latency, etc. to apply to an audio signal.

The hardware processor 301 can access and process physiological data originating from the one or more physiological sensors 315. For example, the hardware processor 301 can implement electrocardiography processing techniques on voltage data originating from electrodes to analyze the user's cardiac activity. For example, the hardware processor 301 can generate ECG waveform data from electrode voltage data. An ECG waveform can include a trend line in the time domain having peaks and valleys with various voltage amplitude representing cardiac electrical activity. The hardware processor 301 can analyze features of the ECG waveform to determine cardiac characteristics, such as heart rate and/or arrythmias. ECG waveform characteristics can include peak amplitudes, valleys amplitudes, RR intervals, PR interval, QRS interval, QT interval, or the like.

The hardware processor 301 can access and process impedance data originating from electrodes on the user. The hardware processor 301 can generate impedance waveform data (in the time domain and/or frequency domain) from the impedance data. The hardware processor 301 can determine one or more physiological characteristics from the impedance data such as respiration rate, respiration pressure, and respiration volume.

The hardware processor 301 can access and process photoplethysmography (PPG) data originating from a PPG sensor such as an oximeter. The hardware processor 301 can determine characteristics of pulsatile blood flow from the PPG data such as pulse rate, blood oxygen saturation, blood pressure, respiration rate, respiration volume, etc.

The hardware processor 301 can access and process other physiological data such as temperature data originating from a thermistor and/or infrared sensor, and inertial data originating from an inertial sensor which can indicate user motion, posture, orientation, etc.

The communication component 303 can facilitate communication (via wireless, wired, and/or wire-like connection) between the auricular device 300 (and/or components thereof) and separate devices, such as separate monitoring hubs, monitoring devices, sensors, systems, servers, or the like. For example, the communication component 207 can be configured to allow the auricular device 300 to wirelessly communicate with other devices, systems, and/or networks over any of a variety of communication protocols, including near-field communication protocols and far-field communication protocols. Near-field communication protocols, which may also be referred to as non-radiative communication, can implement inductive coupling between coils of wire to transfer energy via magnetic fields (e.g., NFMI). Near-field communication protocols can implement capacitive coupling between conductive electrodes to transfer energy via electric fields. Far-field communication protocols, which may also be referred to as radiative communication, can transfer energy via electromagnetic radiation (e.g., radio waves). The communication component 303 can communicate via any variety of communication protocols such as Wi-Fi, Bluetooth®, ZigBee®, Z-wave®, cellular telephony, such as long-term evolution (LTE) and/or 1G, 2G, 3G, 4G, 5G, etc., infrared, radio frequency identification (RFID), satellite transmission, inductive coupling, capacitive coupling, proprietary protocols, combinations of the same, and the like. In some implementations, communication component 303 can implement human body communication (HBC) which can include capacitively coupling a transmitter and receiver via an electric field propagating through the human body. The communication component 303 can allow data and/or instructions to be transmitted and/or received to and/or from the auricular device 300 and separate computing devices. The communication component 303 can be configured to transmit and/or receive (for example, wirelessly) processed and/or unprocessed physiological data with separate computing devices including physiological sensors, other monitoring hubs, remote servers, or the like. As another example, the communication component 303 can be configured to transmit and/or receive (for example, wirelessly) physiological data, audiometry data, and/or playback audio data, with separate computing devices including physiological sensors, other auricular devices, remote servers, or the like. In some implementations, communication component 303 can transfer power required for operation of a computing device. The communication component 303 can be embodied in one or more components that are in communication with each other. The communication component 303 can include one or more of: transceivers, antennas, transponders, radios, emitters, detectors, coils of wire (e.g., for inductive coupling), and/or electrodes (e.g., for capacitive coupling). The communication component 303 can include one or more integrated circuits, chips, controllers, processors, or the like, such as a Wi-Fi chip and/or a Bluetooth chip.

The storage 305 can include any computer readable storage medium and/or device (or collection of data storage mediums and/or devices), including, but not limited to, one or more memory devices that store data, including without limitation, dynamic and/or static random-access memory (RAM), programmable read-only memory (PROM), erasable programmable read-only memory (EPROM), electrically erasable programmable read-only memory (EEPROM), optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. The storage 305 can store data including processed and/or unprocessed physiological data obtained from physiological sensors, and/or audio data originating from microphones, for example. The storage 305 can store program instructions that when executed by the hardware processor 301 cause the auricular device 300 to perform one or more operations.

The power source 307 can provide power for components of the auricular device 300. The power source 307 can include a battery. In some implementations, the power source 307 can be external to the auricular device 300. For example, the auricular device 300 can include or can be configured to connect to a cable which can itself connect to an external power source to provide power to the auricular device 300.

The external microphone 309 can be embodied as part of the auricular device 300. The external microphone 309 can be located within the auricular device 300. The external microphone 309 can be oriented to capture acoustic signals that are external to an car of a user, such as when the external microphone 309 (or the auricular device 300) is donned by the user. The external microphone 309 can be oriented away from a user such as away from an car of a user. The hardware processor 301 can receive audio data generated by the external microphone 309. The hardware processor 301 can use the audio data to perform noise suppression, such as active noise suppression or adaptive noise suppression.

The internal microphone 311 can be embodied as part of the auricular device 300. The internal microphone 311 can generate audio data (which may be referred to as OAE data) responsive to detecting audio originating from an car of a user, such as OAE 320 originating from an inner car and travelling along an car canal of the user. The internal microphone 311 can be oriented to capture audio within an car of a user, such as within an car canal, such as when the internal microphone 311 (or the auricular device 300) is donned by the user. The internal microphone 311 can be oriented toward an car canal of a user. Audio captured by the internal microphone 311 can include audio resulting from activity of hair cells, such as outer hair cells in the cochlea of the user. The audio can include audio resulting from movement of the tectorial membrane of the user. The internal microphone 311 can detect evoked responses such as an acoustic response signal evoked in response to an acoustic stimulus signal. The hardware processor 301 can access audio data (e.g., OAE data) generated by the internal microphone 311 and can determine one or more physiological characteristics of the user from the audio data. For example, the hardware processor 301 can determine one or more inner ear characteristics of the user and/or audiometry data of the user.

The speakers 313 can be embodied as part of the auricular device 300. The speakers 313 can emit audio to an ear of a user. For example, the speakers 313 can emit audio stimulus 310 to evoke an acoustic response from the inner ear such as an OAE 320. The audio stimulus 310 can comprise a plurality of tones, such as two tones. The speakers 313 can emit sound based on an audio playback signal, such as music or media. The speakers 313 can emit a noise cancelling signal. The hardware processor 301 can generate instructions to control an operation of the speakers 313. The hardware processors 301 can transmit audio data to the speakers 313 for the speakers 313 to emit as audio. The speakers 313 can be configured to emit a range of audio frequencies. The speakers 313 can emit multiple frequencies or tones simultaneously. The speakers 313 can include a tweeter, and/or a woofer.

The auricular device 300 can optionally include one or more sensors 315. The sensor 315 can generate physiological data of physiological parameters. The sensor 315 can include acoustic sensors, optical sensors, inertial sensors, temperatures sensors, electrical sensors, voltage sensors, impedance sensors, etc. The sensor 315 can include an oximeter. The sensor 315 can include a photoplethysmography (PPG) sensor configured to measure volumetric variation in blood circulation and derive one or more parameters therefrom, such as pulse rate, blood oxygen saturation, respiration rate, etc. The sensor 315 can include one or more optical emitters configured to emit optical radiation of a plurality of wavelengths, which may include visible light. The sensor 315 can include one or more optical detectors configured to detect optical radiation attenuated by the tissue of subject (which may have been emitted by optical emitters) and generate data relating to the pulsatile characteristics of the subject. The sensor 315 can include electrocardiogram (ECG) sensors, including one or more electrodes, configured to measure electrical activity of the subject, such as cardiac signals. The sensor 315 can include electroencephalography (EEG) sensors. The sensors 315 can detect an evoked response such as electrical signal 330 evoked in response to audio stimulus 310. As an example, the sensors 315 may detect electrical activity of the auditory nerve of a subject such as in response to emitting an acoustic signal into the car of the subject to stimulate activity of the inner ear. In some implementations, the sensors 315 can collect one or more of electroencephalography (EEG) data, auditory brain stem response (ABR) data, electrocochleography (ECoG) data, evoked cortical response data, and/or auditory steady-state response (ASSR) data. The sensor 315 can measure and/or generate data relating to respiration rate, blood oxygen saturation (e.g., SpO2), heart rate, pulse rate, skin temperature, core body temperature, spatial orientation, or the like. The sensor 315 can include inertial sensors (e.g., accelerometer and/or gyroscope) configured to measure linear and/or angular acceleration indicative of a motion and/or posture of a subject. The sensor 315 can include temperature sensors (e.g., thermistor, infrared sensor) configured to measure temperature of a subject such as skin surface temperature and/or core body temperature.

The inertial sensor 317 can include one or more of a motion sensor, vibration sensor, accelerometer, gyroscope, force sensor, and/or a bone conduction microphone. The inertial sensor 317 can include a transducer configured to convert a signal in one form of energy into another form of energy. The inertial sensor 317 can generate inertial data comprising an electrical signal responsive to detecting internal audio 340 conducted through and/or originating from within the user's body. Internal audio 340 can include kinetic energy such as mechanical vibrations and/or a pressure wave conducted through the user's body tissues. Internal audio 340 can originate from activity of a vocal cord of the subject, activity of respiratory airways of the subject, air movement through respiratory airways of the subject, speaking, breathing, coughing, chewing, swallowing, head movement of the subject, jaw movement of the subject, and/or the like. Inertial data generated by the inertial sensor 317 can indicate one or more frequencies of internal audio 340 including low frequencies, such as frequencies of less than 250 Hz, less than 500 Hz, less than 750 Hz, less than 1,000 Hz, less than 1,250 Hz, less than 1,500 Hz, less than 1,750 Hz, less than 2,000 Hz, etc. The processor 301 can determine frequencies of internal audio 340 from the inertial data generated by inertial sensor 317.

Figure 4:
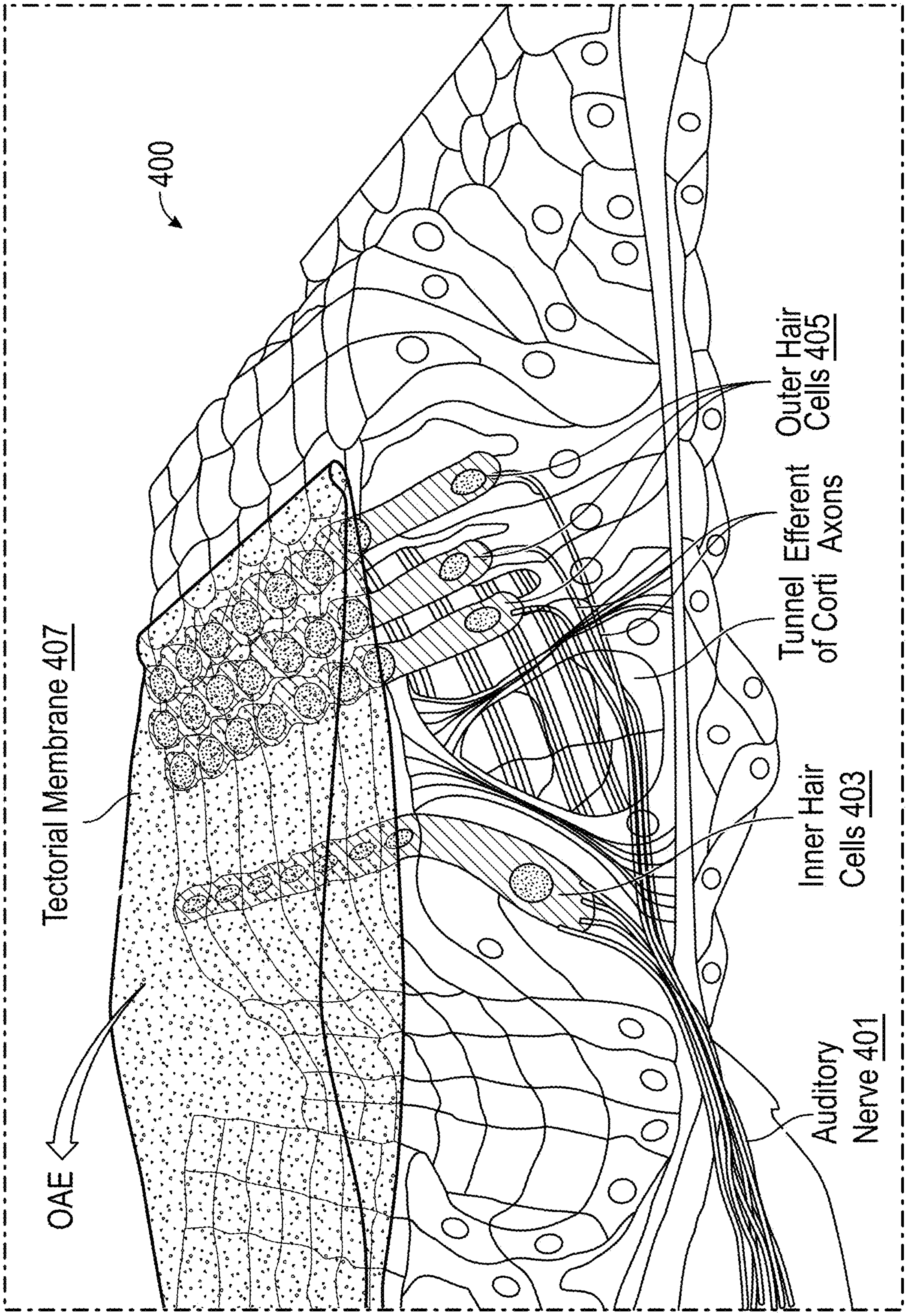
FIG. 4 illustrates various portions of an inner ear of a subject.

FIG. 4 is a perspective cutaway view of example portions of an inner ear 400 of a subject such as a cochlea. The portions of the inner ear shown in FIG. 4 may include portions of a cochlea. The portions of the inner ear shown in FIG. 4 may include portions of an organ of corti. As shown, the inner ear can include an auditory nerve 401, one or more inner hair cells 403, one or more outer hair cells 405, and a tectorial membrane 407. The tectorial membrane 407 may be connected to the inner hair cells 403 and the outer hair cells 405. The auditory nerve 401 may conduct electrochemical signals between the brain and portions of the inner ear 400 such as the inner hair cells 403 and the outer hair cells 405. The auditory nerve 401 may conduct electrochemical signals that may include a voltage differential that may be detected by a physiological sensor. The auditory nerve 401 may include efferent axons that conduct signals from the brain to the outer hair cells 405. The auditory nerve 401 may include afferent axons that conduct signals from the inner hair cells 403 to the brain.

The auditory nerve 401 may communicate signals to the outer hair cells 405 to cause the outer hair cells 405 to relax or contract. Movement of the outer hair cells 405, such as contraction or relaxation, may cause the tectorial membrane 407 to move. Movement of the tectorial membrane 407 may cause pressure differentials in the surrounding air which may cause an acoustic wave or acoustic signal. Acoustic signals generated in response to movement of the tectorial membrane 407 may include OAEs, such as DP-OAE, TE-OAE, S-OAE, etc. Movement of the tectorial membrane 407 may cause the inner hair cells 403 to relax or contract. Movement of the inner hair cells 403, such as contraction or relaxation may cause the inner hair cells 403 to generate a signal to be conducted by the auditory nerve 401 to the brain.

As described herein, a sensor can detect inner car physiological data, such as acoustic signals generated in response to movement of the tectorial membrane 407 and/or electrical signals generated in response to signals conducted along the auditory nerve 401. Inner car physiological data may be used to determine an operational status of various components of the inner ear. For example, detecting and analyzing an acoustic signal generated in response to movement of the tectorial membrane 407, such as an OAE, may indicate whether the outer hair cells 405 are relaxing and/or contracting properly which may indicate whether the inner ear 400 of the subject is properly amplifying certain frequencies which may indicate any hearing loss of the subject. Detecting and analyzing electrical signals of the auditory nerve 401 may likewise indicate similar information.

The inner ear 400 may operate differently based on various circumstances or physiological factors. As an example, pressure changes within the inner ear 400 may change an operation of the inner ear 400, such as operation of the outer hair cells 405 which may affect movement of the tectorial membrane 407. Accordingly, one or more characteristics of an OAE, such as phase, may change as pressure changes within the inner car 400.

Pressure within the inner ear may correspond to intracranial pressure. Intracranial pressure may change based on various factors such as position of the subject, cardiac activity of the subject, respiratory activity of the subject, physical exertion of the subject, acceleration of the subject, temperature of the subject, or the like. For example, as a subject stands up from lying down, the subject's intracranial pressure may change which may affect operation of the inner ear 400 which may affect an OAE generated by the inner car 400. As another example, pressure within the blood vessels of the subject will change during a cardiac cycle of the subject, which can affect intracranial pressure which can in turn affect an OAE. As another example, intracranial pressure may change during a respiratory cycle of the subject which can affect OAE. Accordingly, measuring and analyzing inner car data, such as an OAE, alone or in combination with other physiological data, may provide information relating to the intracranial pressure of the subject.

As another example of the inner car 400 operating differently based on various circumstances, changes in blood oxygen saturation within the inner ear may affect an operation of the inner ear 400, such as operation of the outer hair cells 405 which may affect movement of the tectorial membrane 407. Accordingly, one or more characteristics of an OAE, such as phase, may change as blood oxygen concentration changes within the inner car 400. The inner ear 400 may be sensitive to changes in blood oxygen concentration. For example, slight changes in blood oxygen levels within the inner ear 400 may greatly affect operation of the inner ear 400 which can an OAE generated by the inner ear 400. As an example, the auditory nerve 401 and/or outer hair cells 405 may operate differently during states of hypoxia, normoxia, and/or hyperoxia, which may result in changes in an OAE generated by the inner car 400. Accordingly, measuring and analyzing inner ear data, such as an OAE, alone or in combination with other physiological data, may provide information relating to an oxygenation status of the subject, such as an intracranial oxygenation status. Using inner car data may to monitor oxygenation of the subject may help prevent the subject's oxygenation from reaching harmful levels such as excessive hyperoxia which may result in blindness in newborns or excessive hypoxia which may lead to tissue damage such as in the brain.

Figure 5A:
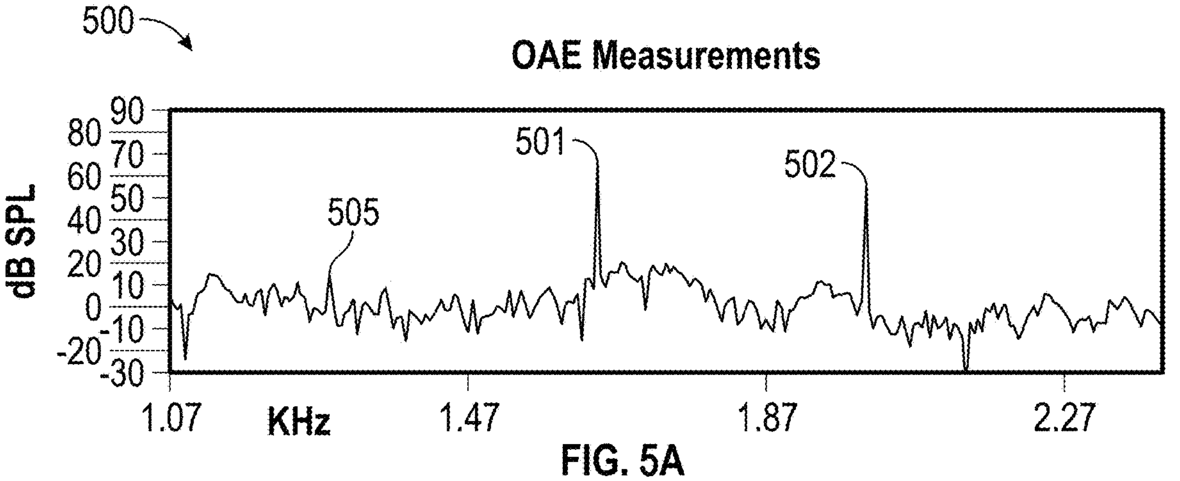
FIG. 5A is a diagram illustrating example audiometry data from an OAE test.
Figure 5B:
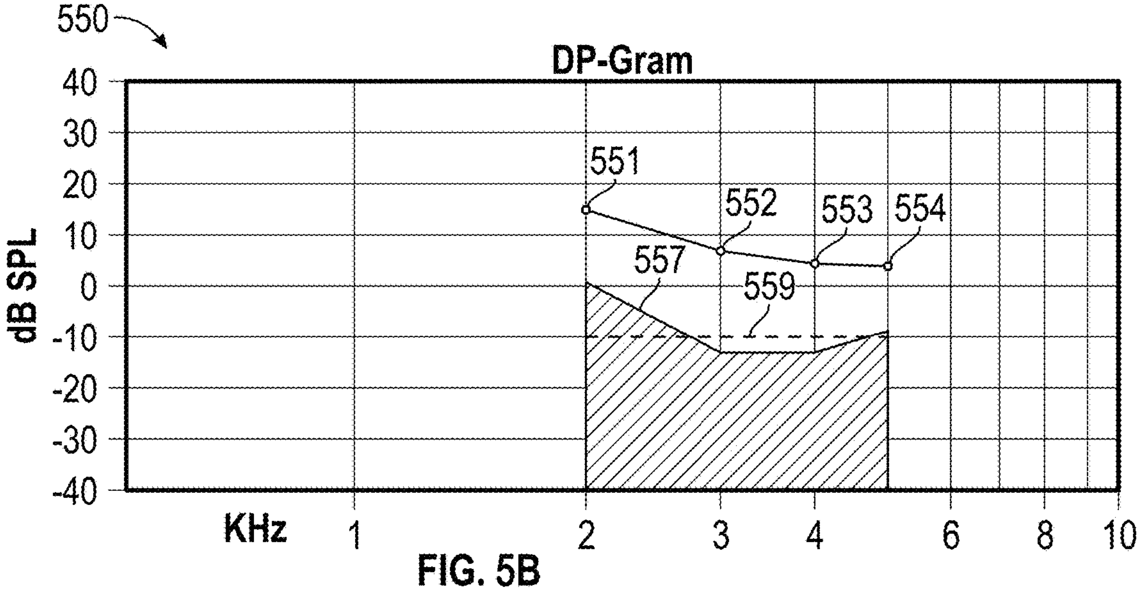
FIG. 5B is a diagram illustrating an example DP-gram.

FIGS. 5A-5B illustrate graphs comprising example audiometry data. FIG. 5A illustrates graph 500 which shows example audiometry data from OAE measurements. The graph 500 shows data along an X-axis corresponding to frequency (kHz) and along a Y-axis corresponding to decibel (dB) also referred to as sound pressure level (SPL). Data point 501 corresponds to a first stimulus tone which may also be referred to as a first input frequency or f1. In this example, as shown by data point 501, the first input frequency (f1) has a frequency of about 1,642 Hz and a dB SPL of between 60 dB and 70 dB or about 65 dB. Data point 502 corresponds to a second stimulus tone which may also be referred to as a second input frequency or f2. In this example, as shown by data point 501, the second input frequency (f2) has a frequency of about 2,002 Hz and a dB SPL of between 50 dB and 60 dB or about 55 dB. In some implementations, a ratio of f2 to f1 (e.g., f2/f1) can be between about 1.10 and about 1.30, between about 1.20 and about 1.25, about 1.21, or about 1.22. In some implementations, the frequencies of f1 and/or f2 may change so long as the ratio of f2/f1 remains about 1.22, as described. f1 and f2 may have amplitudes ("L1") and ("L2") respectively. L1 may be separated by L2 by about a 10- to 15-dB level difference. A speaker, such as in an auricular device, can emit first and second frequencies (f1 and f2) into an ear canal of a user (e.g., simultaneously) to evoke an OAE from the user's cochlea. Data point 505 corresponds to an OAE (e.g., a distortion product OAE) which may have been evoked by input frequencies f1 and f2. In this example, as shown by data point 505, the OAE has a frequency of about 1,281 Hz and a dB SPL of between 10 dB and 20 dB or about 14.7 dB. The OAE can be a DP-OAE and can be referred to as the cubic difference tone. The OAE may have a frequency equal to about 2*F1−F2. For example, if F1=1000 Hz and F2=1200 Hz, then 2*F1−F2=800 Hz. A microphone, such as an internal microphone in an auricular device, can detect the OAE emanating from the user's inner ear.

Any of the computing devices shown and/or described herein, such as an auricular device, can generate the data shown in graph 500. For example, a hardware processor can generate the data in graph 500 responsive to a microphone in an auricular device detecting audio (either stimulus audio input into a user's ear or audio emanating from a user's inner ear). For example, the auricular device can measure OAE from a user's inner ear (e.g., cochlea). The data in graph 500 may correspond to a plurality of measurements. For example, the data in graph 500 may correspond to eight measurement samples over a period of time such as 1.5 seconds.

As used herein, "audiometry data" can include processed audio data originating from a microphone representative of an OAE and/or audio data corresponding to input stimulus audio introduce to an car from a speaker. For example, audiometry data can include any of the data, or associated characteristics, shown and/or described in graph 500 such as the frequency, amplitude (dB SPL), latency (defined as time interval between stimulus and OAE detection), and/or phase of any of the stimulus tones (f1, f2) or the measured OAEs. Audiometry data can include a noise floor or hearing threshold.

FIG. 5B illustrates a graph 550 representing an example DPgram having data corresponding to a plurality of OAE measurements including the OAE measurement shown in graph 500 of FIG. 5A. Specifically, data point 551 corresponds to the graph 500 of FIG. 5A (e.g., the frequency of data point 551 corresponds to the frequency of data point 502 and the amplitude of data point 551 corresponds to the amplitude of data point 505). The DPgram shown in graph 550 comprises data points 551-554, a noise floor 557, and a minimum OAE level 559. A frequency of data points 551-554 represents a frequency used for an input audio stimulus (e.g., f2) to evoke an OAE. For example, data point 501 has a frequency of about 2,002 Hz corresponding to the f2 shown by data point 502 in graph 500. A dB SPL of data points 551-554 represents a dB level of an OAE. For example, data point 551 has a dB SPL of about 14.7 dB corresponding to the dB SPL of data point 505 in graph 500. One or more measurement samples may be used to generate data points 551-554. Different numbers of measurement samples may be used to generate data points 551-554, and/or different lengths of measurement time.

In this example, the minimum OAE level 559 is about −10 dB. OAEs with dB SPL below the minimum OAE level 559 may be considered to be insignificant. The noise floor 557 indicates that an OAE test should end because residual noise is so low that extending test time will not produce significant results.

As used herein, "audiometry data" may refer to any of the data, or associated characteristics, shown and/or described in graph 550. For example, audiometry data may refer to the frequencies or dB SPL of any of data points 551-554. Audiometry data can comprise an auditory profile of a user including information corresponding to a plurality of OAE measurements such as shown in the graph of FIG. 5B. In some cases, a DPgram, or characteristics of a DPgram, can be referred to as an auditory profile of a user.

Figure 5C:
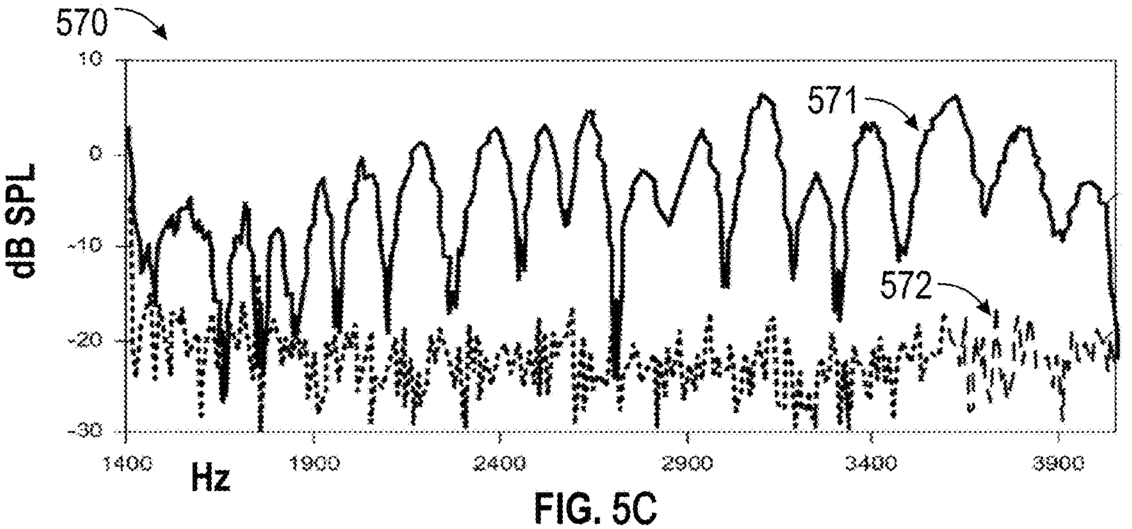
FIG. 5C is a diagram illustrating an example DP-gram.

FIG. 5C illustrates a graph 570 representing an additional example DPgram comprising a plurality of OAE data points along line 571. The OAE data points along line 571 may be generated from two separate sites within the cochlea, a primary and a secondary site, the signals from each constructively and destructively interfere with each other, making crests and troughs in the response. The pattern of the specific locations (in the frequency domain) of the crests and troughs is called fine structure and is unique to each car. The graph 570 comprises a plurality of data points along line 572 representing a noise floor.

Figure 6:
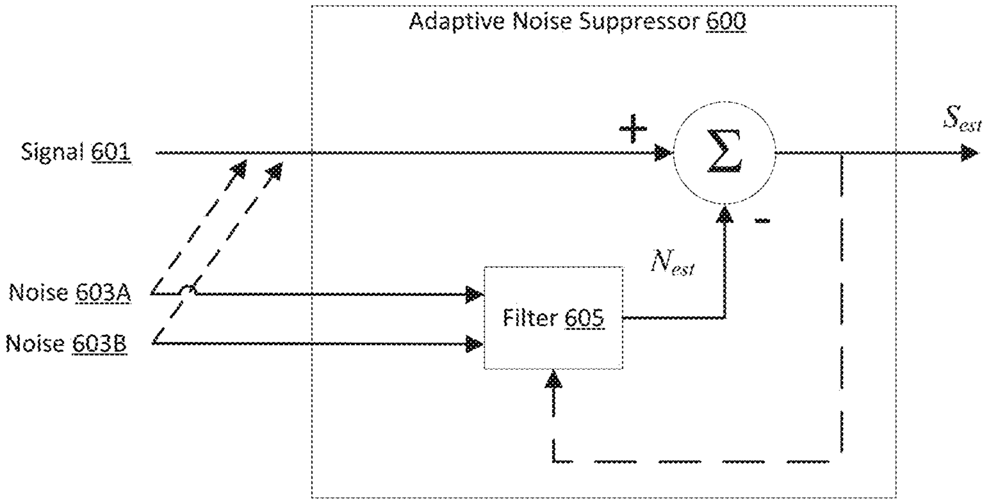
FIG. 6 is a diagram illustrating an example adaptive noise suppressor.

FIG. 6 is a block diagram illustrating an example adaptive noise suppressor 600. The adaptive noise suppressor 600 can be implemented by one or more hardware processors, such as hardware processor 301 shown and/or described herein. The adaptive noise suppressor 600 can receive a signal 601. For example, the signal 601 may be detected by an acoustic sensor such as a microphone, such as internal microphone 311 shown and/or described herein. In some implementations, the signal 601 may correspond to inner car physiological data as discussed herein, such as an OAE. The noise 603 can correspond to an acoustic or non-acoustic signal. For example, the noise 603 may be an electrical signal or a mechanical signal, such as vibrations. In some implementations, the noise 603 can originate from one or more sources such as internal to the user's body (represented by noise 603A) and external to the user's body (represented by noise 603B). The noise 603 may represent an undesired signal. The noise 603 may originate from a different source than the signal 601. As shown, the noise 603 may mix with the signal 601 such that the adaptive noise suppressor 600 may receive the signal 601 mixed with the noise 603.

The adaptive noise suppressor 600 can receive the noise 603. The adaptive noise suppressor 600 can receive the noise 603 separately from the signal 601. The noise 603 may be detected at an acoustic sensor, such as a microphone, such as external microphone 209 shown and/or described herein. The noise 603 may be detected at an inertial sensor, such as an accelerometer or bone conduction microphone.

The adaptive noise suppressor 600 can apply a filter 605 to the noise 603. The filter 605 can be an analogue filter. The filter 605 can be a digital filter. The filter 605 can be an adaptive filter. The adaptive noise suppressor 600 may adjust a transfer function associated with the filter 605. The adaptive noise suppressor 600 may adjust a frequency response associated with the filter 605. The adaptive noise suppressor 600 may adjust an impulse response associated with the filter 605. The adaptive noise suppressor 600 may adjust one or more filter weights associated with the filter 605. The adaptive noise suppressor 600 may adjust one or more characteristics of the filter 605 based on an adaptive algorithm. The adaptive noise suppressor 600 may adjust one or more characteristics of the filter 605 based on a feedback loop, such as based on an output of the adaptive noise suppressor 600.

The filter 605 may output a noise estimate (Nest). Nest may approximate the noise 603. The adaptive noise suppressor 600 may subtract the Nest from the signal 601 which may be corrupted by the presence of the noise 603. The adaptive noise suppressor 600 may design the filter 605 to approximate the noise 603 as closely as possible to avoid further distorting the signal 601 when subtracting Nest from the signal 601. The adaptive noise suppressor 600 may subtract the Nest from the signal 601 by applying a filter to the signal 601. The adaptive noise suppressor 600 may apply a high pass filter to the signal 601 to remove low frequencies from the signal 601. The adaptive noise suppressor 600 may determine a cutoff frequency to filter the signal 601 based on the Nest.

The adaptive noise suppressor 600 may output a signal estimate (Sest). The Sest may approximate the signal 601. The adaptive noise suppressor 600 may adjust one or more characteristics of the filter 605 based on the output Sest. The adaptive noise suppressor 600 may control the filtering and subtraction by an adaptive process because the characteristics of the channels transmitting the noise 603 from the noise source to the adaptive noise suppressor 600 may not be known and may be unpredictable, Accordingly, the filter 605 may be an adaptive filter and the adaptive noise suppressor 600 may adjust one or more characteristics of the filter 605 such as transfer function, frequency response, and/or impulse response to more closely approximate Nest to the noise 603 and to minimize possible error of distorting the signal 601.

Figure 7:
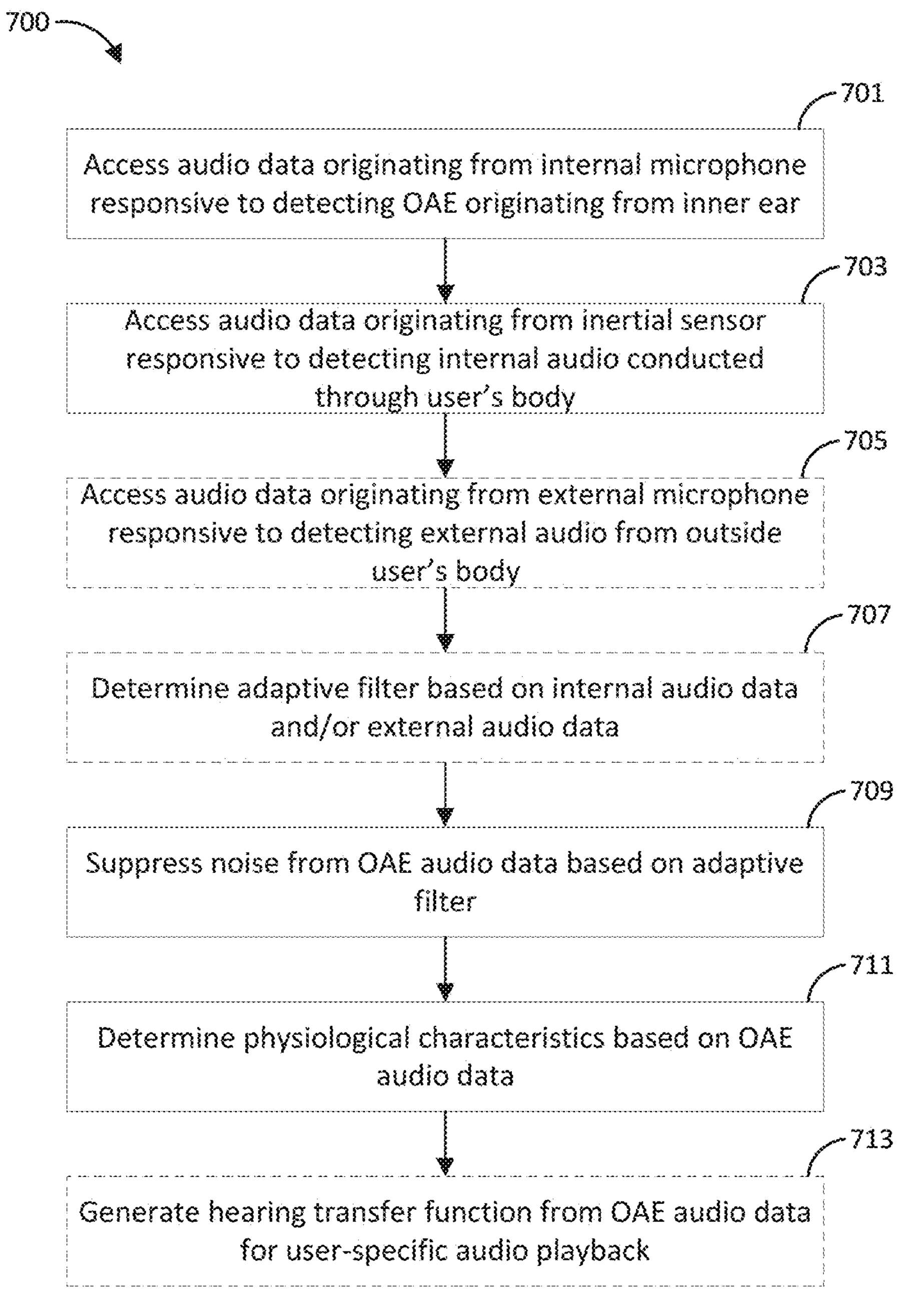
FIG. 7 is a flowchart illustrating an example process of adaptively filtering OAE audio data.

FIG. 7 is a flowchart illustrating an example process 700 of adaptively filtering OAE audio data for subsequent processing. This process, in full or parts, can be executed by one or more hardware processors, whether they are associated with a singular or multiple computing devices, and even devices in remote or wireless communication. By way of example, the one or more hardware processors executing process 700 can be associated with auricular device 100/300, a wearable device such as a watch, a mobile device such as a phone, a laptop, a tablet, and/or any of the electronic computing devices shown and/or described herein. The implementations of this process may vary and can involve modifications like omitting blocks, adding blocks, and/or rearranging the order of execution of the blocks. Process 700 serves as an example and is not intended to restrict the present disclosure.

As shown in process 700, analyzing OAE data in combination with other audio data, such as internal audio data, can improve determining physiological characteristics of a subject. For example, internal audio such as swallowing, breathing, talking, chewing, head movements, jaw movements, can be noise that corrupts the quality of OAE. The process 700 may accordingly account for internal audio (or other noise sources such as external audio) when using OAE data to assess physiological characteristics of a user.

At block 701, a computing device (e.g., one or more hardware processors of a computing device executing program instructions) can access audio data generated by an internal microphone responsive to detecting one or more OAEs originating from an inner car of a user and conducted through an car canal via air. Such audio data can be referred to as OAE audio data. The OAE audio data can be in the form of an electrical signal and can originate from a microphone responsive to the microphone detecting the OAE. The OAE audio data can include analogue and/or digital data. The computing device can access the OAE audio data from storage. For example, the OAE audio data can include historical OAE audio data that was previously generated by a microphone prior to being accessed for processing. In some implementations, a processor can receive the OAE audio data from the microphone directly for processing without the OAE audio data being stored in storage. For example, the processor can access the OAE audio data in substantially real-time as the OAE audio data is generated by the microphone. The computing device can access the OAE audio data continuously. The OAE audio data can be a continuous stream of data. In some implementations, the OAE audio data can be generated by one or more physiological sensors, which can include electrodes, responsive to detecting electrical activity of the auditory system of the subject. Such electrical activity can relate to one or more of auditory brainstem response (ABR), mid-latency response, cortical response, acoustic change complex, auditory steady state response (ASSR), complex auditory brainstem response, electrocochleography (ECoG), cochlear microphonic, cochlear neurophonic AEPs, electroencephalography (EEG), or the like.

At block 703, the computing device can access audio data generated by an inertial sensor responsive to detecting internal audio conducted through the body of the user. Such audio data can be referred to as internal audio data. The internal audio data can correspond to audio generated from activity of a vocal cord of the subject (e.g., due to talking), activity of respiratory airways of the subject (e.g., such as air movement due to speaking, breathing, coughing, etc.), activity of an esophagus of a subject (e.g., due to chewing, swallowing, etc.), or other internal sounds which may arise from head movement of the subject, jaw movement of the subject, and/or the like. The internal audio data can include low frequencies, such as frequencies between 50 Hz and 250 Hz, between 200 Hz and 500 Hz, between 400 Hz and 750 Hz, between 600 Hz and 1000 Hz, between 750 Hz and 1250 Hz, between 1250 Hz and 1500 Hz, between 1500 Hz and 1750 Hz, or between 1750 Hz and 2000 Hz, etc. The internal audio data can be in the form of an electrical signal and can originate from an inertial sensor responsive to the inertial sensor detecting the internal audio. The inertial sensor can be a vibration sensor such as a bone conduction microphone. The internal audio data can include analogue and/or digital data. The computing device can access the internal audio data from storage. For example, the internal audio data can include historical internal audio data that was previously generated by an inertial sensor prior to being accessed for processing. In some implementations, a processor can receive the internal audio data from the inertial sensor directly for processing without the internal audio data being stored in storage. For example, the processor can access the internal audio data in substantially real-time as the internal audio data is generated by the inertial sensor. The computing device can access the internal audio data continuously. The internal audio data can be a continuous stream of data.

At block 705, the computing device can optionally access audio data generated by an external microphone responsive to detecting external audio originating from outside of the user's body and conducted through air. Such audio data can be referred to as external audio data. The external audio data can be in the form of an electrical signal and can originate from an external microphone responsive to the microphone detecting the external audio. The external audio data can include analogue and/or digital data. The computing device can access the external audio data from storage. For example, the external audio data can include historical external audio data that was previously generated by a microphone prior to being accessed for processing. In some implementations, a processor can receive the external audio data from the microphone directly for processing without the external audio data being stored in storage. For example, the processor can access the external audio data in substantially real-time as the external audio data is generated by the microphone. The computing device can access the external audio data continuously. The external audio data can be a continuous stream of data.

In some implementations, the computing device can optionally adjust an operation of a speaker of an auricular device based on any of the audio data described at any of blocks 701, 703, or 705. The speaker can emit an acoustic stimulus signal into the car of a subject to evoke a response such as an OAE. Adjusting the operation of the speaker can include adjusting a time at which the speaker emits an acoustic signal. As an example, the processor can control a time at which the speaker emits an acoustic signal to control a time at which an OAE occurs based on acoustic data (e.g., internal acoustic data from a bone conduction microphone), which may optimize the quality of the OAE. Adjusting the operation of the speaker can include adjusting an amplitude of an acoustic signal emitted from the speaker. Adjusting the operation of the speaker can include adjusting a frequency of an acoustic signal emitted from the speaker.

At block 707, the computing device can optionally determine an adaptive filter for suppressing noise from the OAE audio data. The internal audio and/or the external audio can be noise that corrupts the OAE audio. The computing device can determine the adaptive filter based on comparing one or more characteristics of the internal audio data with one or more characteristics of the external audio data. Such characteristics can include an amplitude (decibel level) of the internal audio data and/or the external audio data. For example, the computing device can select a first adaptive filter if a primary component of the noise is from the internal audio (which can be indicated by the amplitude of the internal audio data surpassing a threshold relative to the external audio data) and can select a second adaptive filter if a primary component of the noise is from the external audio (which can be indicated by the amplitude of the external audio data surpassing a threshold relative to the internal audio data). Selecting a filter for noise suppression based on the source of the noise (whether internal or external) can improve the noise suppression because the filter will be specific to the source of noise. Determining the adaptive filter can include determining one or more characteristic of the filter such as transfer function, frequency response, and/or an impulse response. Determining the adaptive filter can include selecting one of a pre-determined set of adaptive filters, or characteristics thereof. Accordingly, adaptively selecting one or more filters or characteristics of a filter, based on the source of the noise can improve noise suppression by more closely tailoring the filter to the characteristics of the noise.

At block 709, the computing device can suppress noise (e.g., external and/or internal audio data) from the OAE audio data based on the adaptive filter. Suppressing noise from the OAE audio data can include subtracting internal audio data and/or external audio data (or filtered versions thereof) from the OAE audio data. For example, the computing device can apply a high pass filter to the OAE audio data (which can remove low frequency noise corresponding to internal audio). The high pass filter can have a cut off frequency between 250 Hz and 500 Hz, between 500 Hz and 750 Hz, between 750 Hz and 1000 Hz, between 1000 Hz and 1250 Hz, between 1250 Hz and 1500 Hz, between 1500 Hz and 1750 Hz, or between 1750 Hz and 2000 Hz, for example.

In some implementations, the computing device can suppress noise from the OAE audio data by discarding one or more values or portions of the OAE audio data. Discarding OAE audio data can include rejecting, ignoring, deleting, erasing from memory, preventing storage in memory, setting a value to zero, or the like. In some cases, simply discarding OAE audio data that has become so corrupted by noise can more efficiently improve quality of overall OAE audio data than trying to suppress noise from the OAE audio data. As an example, the computing device can discard portions of the OAE audio data that correspond (e.g., in time) to portions of the internal and/or external audio data that exceed a threshold amplitude.

At block 711, the computing device can determine one or more physiological characteristics of a subject based on OAE audio data which can include adjusted (e.g., noise-suppressed) OAE audio data. In some implementations, the computing device can further process the OAE audio data such as to generate a user hearing profile or any other audiometry data described herein which can be used to determine the physiological characteristics.

The physiological characteristics can include auditory characteristics of the subject. The physiological characteristics can include inner ear characteristics. The physiological characteristics may indicate an operational capability of one or more of a cochlea, an organ of corti, hair cells, outer hair cells, inner hair cells, tectorial membrane, and/or auditory nerve of the subject. The physiological characteristics can include an indication of hearing sensitivity, hearing loss, hearing loss at certain frequencies, or the like. For example, physiological characteristics may indicate whether outer hair cells of the subject are operating to amplify certain frequencies by moving a tectorial membrane of the subject. In some implementations, the processor can determine the physiological characteristics as part of a screening or diagnostic assessment of acoustic function. For example, the physiological characteristics may be a part of a screening regimen to determine the auditory health of newborn babies. As another example, the processor can monitor ototoxicity damage to hearing health (e.g., caused by ototoxic drugs used to treat cancer) based on monitoring auditory function. In some implementations, the processor can determine physiological characteristics based on one or more of a phase, amplitude, latency, and/or frequency of the OAE audio data.

The physiological characteristics can include oxygenation of the subject, including intracranial oxygenation. The computing device can determine oxygenation based on at least the OAE audio data, alone or in combination with, the physiological data, such as blood oxygenation saturation obtained from a pulse oximeter. OAE audio data can change based on oxygenation of the inner ear. The computing device can analyze a phase change of the OAE audio data, and how the phase change corresponds to blood oxygenation saturation to determine an indication of intracranial oxygenation of the subject. The inner ear is sensitive to changes in oxygenation. For example, the auditory nerve and/or hair cells may not function properly to generate OAEs. By using inner car physiological data, such as OAE data, the processer can indicate changes in oxygenation to prevent harmful physiological consequences such as excessive oxygen saturation (e.g., hyperoxia), which can lead to blindness in newborns, or under oxygen saturation (e.g., hypoxia), which can lead to permanent brain damage.

The physiological characteristics can include intracranial pressure (ICP). Changes in ICP can cause changes in OAE (such as phase changes, amplitude changes, etc.). The computing device can monitor changes in OAE to determine changes in ICP. In turn, the computing device can determine cardiac activity, respiratory activity, and/or orientation of the subject based on the ICP. Changes in cardiac activity, such as during a heart beat cycle, can change blood pressure, which can change ICP. Changes in respiratory activity, such as during a respiration cycle, can change blood pressure, which can change ICP. Changes in orientation of the subject (e.g., raising or lowering head) can change ICP. The processor can analyze OAE audio data alone or in combination with cardiac data to determine an indication of intracranial pressure. For example, the processor can analyze a phase change of the OAE data, and how the phase change corresponds to heart beat cycles to determine an indication of intracranial pressure of the subject.

At block 713, the computing device can optionally generate a hearing transfer function for the user based on the OAE audio data. A computing device, such as an auricular device, can implement a hearing transfer function for user-specific audio playback. For example, an auricular device can adjust audio playback according to a hearing transfer function to improve the auditory listening experience of the user. As described herein, a hearing transfer function can indicate which frequencies to adjust and by how much to adjust their amplitudes so that a user's perceives those frequencies at a desired decibel level (e.g., to recreate "normal" hearing).

Figure 8:
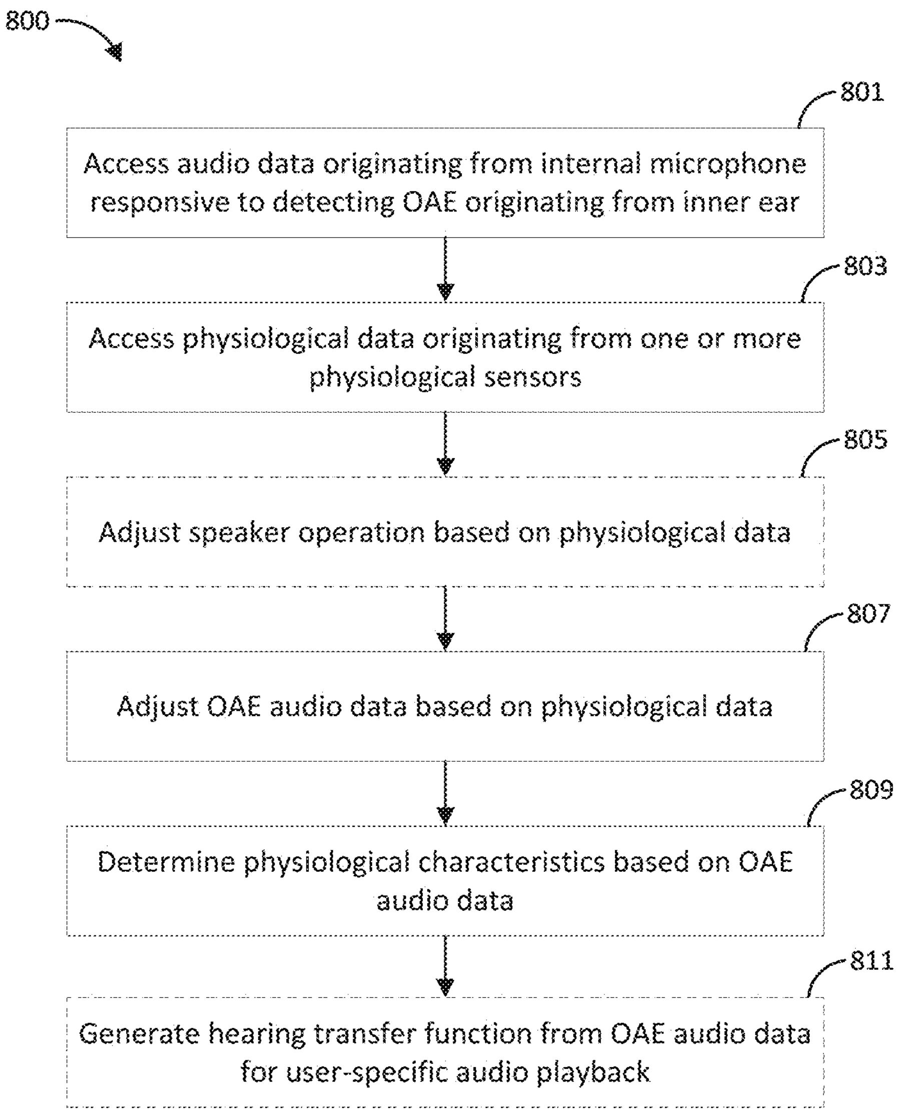
FIG. 8 is a flowchart illustrating an example process of adjusting OAE audio data based on physiological data.

FIG. 8 is a flowchart illustrating an example process 800 of adjusting OAE audio data based on physiological data for subsequent processing. This process, in full or parts, can be executed by one or more hardware processors, whether they are associated with a singular or multiple computing devices, and even devices in remote or wireless communication. By way of example, the one or more hardware processors executing process 800 can be associated with auricular device 100/300, a wearable device such as a watch, a mobile device such as a phone, a laptop, a tablet, and/or any of the electronic computing devices shown and/or described herein. The implementations of this process may vary and can involve modifications like omitting blocks, adding blocks, and/or rearranging the order of execution of the blocks. Process 800 serves as an example and is not intended to restrict the present disclosure.

As shown in process 800, analyzing OAE data in combination with physiological data can improve determining physiological characteristics of a subject. Physiological data can correspond to physiological processes, such as cardiac cycle or respiratory cycles, that generate noise that can corrupt an OAE. Physiological data can correspond to physiological processes that alter an OAE such as by changing intracranial pressure (ICP) and/or changing body temperature. The process 700 may accordingly account for such physiological processes and how they can affect OAE when using OAE data to assess physiological characteristics of a user. Accordingly, OAE quality can be preserved for improved processing. Moreover, OAE can be accurately measured across a broader range of frequencies (such as low frequencies of less than 400 Hz) corresponding to physiological events (e.g., heart contraction generating noise at less than 400 Hz) that might have otherwise excessively corrupted the OAE.

At block 801, a computing device (e.g., one or more hardware processors of a computing device executing program instructions) can access audio data generated by an internal microphone responsive to detecting one or more OAEs originating from an inner ear of a user and conducted through an ear canal via air. Such audio data can be referred to as OAE audio data. The OAE audio data can be in the form of an electrical signal and can originate from a microphone responsive to the microphone detecting the OAE. The OAE audio data can include analogue and/or digital data. The computing device can access the OAE audio data from storage. For example, the OAE audio data can include historical OAE audio data that was previously generated by a microphone prior to being accessed for processing. In some implementations, a processor can receive the OAE audio data from the microphone directly for processing without the OAE audio data being stored in storage. For example, the processor can access the OAE audio data in substantially real-time as the OAE audio data is generated by the microphone. The computing device can access the OAE audio data continuously. The OAE audio data can be a continuous stream of data. In some implementations, the OAE audio data can be generated by one or more physiological sensors, which can include electrodes, responsive to detecting electrical activity of the auditory system of the subject. Such electrical activity can relate to one or more of auditory brainstem response (ABR), mid-latency response, cortical response, acoustic change complex, auditory steady state response (ASSR), complex auditory brainstem response, electrocochleography (ECoG), cochlear microphonic, cochlear neurophonic AEPs, electroencephalography (EEG), or the like.

At block 803, the computing device can access physiological data originating from one or more physiological sensors. The physiological data can include voltage data, impedance data, decibel data, cardiac data, electrocardiography (ECG) data, electromyography (EMG) data, electrooculography (EOG) data, respiration data, pressure data, position data, motion data, PPG data, inertial data, vibration data, acoustic data, and/or temperature data. The physiological data can include processed physiological data. The physiological data can include a waveform, such as an ECG waveform, a respiratory waveform, or a pulse waveform. A respiratory waveform can be an impedance-based waveform (from ECG data) and/or a PPG-based waveform. The physiological data may correspond to a physiological event that generates noise that can interfere with otoacoustic emissions such as if the noise from the physiological event and the otoacoustic emissions occur at similar frequencies (e.g., within a threshold of each other). For example, a heart contraction can generate noise that has a frequency similar to an OAE which can corrupt the quality of the OAE. As discussed, process 800 can advantageously account for such noise to preserve the quality of an OAE and to allow for detecting OAEs across a broader range of frequencies which may have otherwise been too corrupted at certain frequencies to be useful due to noise from physiological events at those same frequencies. The physiological data can correspond to physiological processes that generate audio such as cardiac activity and respiratory activity which may corrupt an OAE. The physiological data can correspond to physiological processes and/or parameters, such as SpO2, temperature, and/or intracranial pressure (e.g., blood pressure), that do not generate audio that corrupts an OAE but which may however impact an inner ear's ability to generate normal OAEs.

The physiological data can include analogue and/or digital data. The computing device can access the physiological data from storage. For example, the physiological data can include historical physiological data that was previously generated by a physiological sensor prior to being accessed for processing. In some implementations, a processor can receive the physiological data from the sensor directly for processing without the physiological data being stored in storage. For example, the processor can access the physiological data in substantially real-time as the physiological data is generated by the sensor. The computing device can access the physiological data continuously. The physiological data can be a continuous stream of data.

At block 805, the computing device can optionally adjust an operation of a speaker of an auricular device based on the physiological data. The speaker can emit an audio stimulus into the car of a subject to evoke a response such as an OAE. The audio stimulus can comprise a plurality of tones, such as two tones. Adjusting the operation of the speaker can include adjusting a time at which the speaker emits an audio stimulus. As an example, the computing device can control a time at which the speaker emits an audio stimulus based on the occurrence of physiological processes determined from the physiological data to control a time at which an OAE occurs. Adjusting the timing of OAE measurements to account for (e.g., avoid) physiological processes such as cardiac cycles or respiratory cycles, can optimize the quality of the OAE by reducing the presence of noise that may corrupt the OAE quality. Adjusting the operation of the speaker can include preventing the speaker from emitting an audio stimulus signal, such as for a predetermined length of time, such as during a certain portion of a cardiac or respiratory cycle. Adjusting the operation of the speaker can include adjusting a volume of an audio stimulus signal emitted from the speaker. Adjusting audio stimulus amplitude can cause proportional changes in amplitude of OAE evoked responsive to the audio stimulus. For example, an audio stimulus having an amplitude of "L" can evoke an OAE having an amplitude of X*L, where X is a scalar factor of less than 1.0 in some cases. Adjusting the operation of the speaker to increase an amplitude of OAE can cause the OAE amplitude to be greater than, or at least more easily distinguishable from, noise occurring from physiological events. Adjusting the operation of the speaker can include adjusting a frequency of an audio stimulus emitted from the speaker. Adjusting audio stimulus frequency can cause proportional changes in frequency of OAE evoked responsive to the audio stimulus. For example, an audio stimulus having frequencies at f1 and f2 can evoke an OAE having a frequency of 2f1−f2. Adjusting the operation of the speaker to change a frequency of OAE can cause the OAE frequency to be different than frequencies of noise resulting from physiological events, which can reduce the interference of the noise with the OAE. For example, the speaker can emit frequencies to evoke a high frequency OAE when physiological processes are occurring that generate low frequencies to avoid signal interference, and vice versa when physiological processes are occurring that generate high frequencies. The computing device can analyze historical physiological data to determine expected future physiological events and when they will occur. For example, the computing device can analyze historical cardiac data to estimate future occurrence of cardiac activity such as Q, R, S, T events on an ECG waveform. The computing device can control operation of the speaker based on estimated future physiological events such as to avoid evoking an OAE during the future estimated event.

At block 807, the computing device can adjust the OAE audio data based on the physiological data. The computing device can analyze features of the physiological data such as amplitude, peaks, valleys, maximum values, minimum values, frequencies, or the like. As discussed, physiological data can include ECG data which can include voltage values (such as on an ECG waveform) or impedance values (such as on a respiration waveform), PPG data (from which volumetric changes, blood pressure, pulse waveform can be derived), decibel data, inertial data, temperature data, etc. In some implementations, the computing device can determine that a feature occurs if the physiological data is greater than a threshold, is less than a threshold, and/or is within threshold limits. In some implementations, the computing device can determine that feature occurs if the physiological data exceeds a threshold for longer than a threshold time. Physiological data features can correspond to physiological events which may be cyclical physiological events, such as cardiac cycles, respiration cycles, or pulse cycles, or which may be non-cyclical events such as intracranial pressure or body temperature. For example, a voltage peak on an ECG waveform can correspond to a heart contraction at which time the heart may be generating the most noise. As another example, a peak on a respiration waveform (which can be derived from an impedance data and/or PPG data), can correspond to a time between inhalation and exhalation when air is substantially motionless in the airways of the subject and thus generating the least noise during the respiration cycle. As another example, a peak on a pulse waveform (which can be derived from PPG data), can correspond to a heart contraction at which time the heart may be generating the most noise. As another example, inertial sensor data exceeding a threshold can be a feature that can correspond to the user being in a certain orientation (e.g., indicating head elevation) which may affect intracranial pressure (such as if blood rushes to, or drains from, the head) which may affect inner ear operation (indicating that OAE measurements at that time may be affected). As another example, body temperature exceeding a threshold may be a feature in physiological data that can correspond to atypical functioning of the inner car. The computing device can analyze the features of the physiological data with respect to time (e.g., in the time domain). The computing device can determine a time at which features of the physiological data occur. The computing device can compare the physiological data with the OAE audio data based on time. The computing device can map the physiological data to the OAE audio data based on time to determine when physiological events occur (as indicated by features in physiological data) relative to when OAE audio data occurs.

Adjusting OAE audio data can include discarding one or more values or portions of the OAE audio data. Discarding can include rejecting, ignoring, deleting, erasing from memory, preventing storage in memory, setting a value to zero, or the like. As an example, the computing device can discard portions of the OAE audio data that correspond (e.g., in time) to the occurrence of features in the physiological data (which can indicate occurrence of physiological events that might introduce noise to the OAE audio data). Accordingly, subsequent processing/analysis with the OAE audio data may not include portions of the OAE audio data that have been corrupted by noise from physiological processes which can advantageously improve the accuracy of the processing/analysis.

Adjusting OAE audio data can include assigning weights (or adjusting previously assigned weights) to values or portions of the OAE audio data. Weighting the OAE audio data can correspond to a degree to which the OAE audio data may be corrupted by noise from physiological processes. As an example, the computing device can assign certain weights to portions of the OAE audio data that correspond (e.g., in time) to the occurrence of features in the physiological data (which can indicate occurrence of physiological events that might introduce noise to the OAE audio data) and can assign other weights to other portions of the OAE audio data that correspond (e.g., in time) to the occurrence of other features in the physiological data (which can indicate occurrence of physiological events that might not introduce noise to the OAE audio data). Assigning weights to OAE audio data can include multiplying the OAE audio data by a scalar factor. Assigning a range of weights to OAE audio data can account for a range of physiological events that may affect OAE differently. Weighting the OAE audio data can improve accuracy of subsequent processing of the weighted OAE audio data, such as when determining physiological characteristics of the subject based on the weighted OAE audio data. For example, the effect of certain weighted OAE audio data in subsequent processing/analysis may be minimized to correspond to a degree to which the OAE audio data may be corrupted by noise from physiological processes.

Adjusting OAE audio data can include binning values or portions of the OAE audio data. As an example, the computing device can assign OAE audio data to different bins based on whether the OAE audio data corresponds (e.g., occurs at a same time) to certain physiological data features. Accordingly, the computing device can bin the OAE audio data based on how it corresponds in time to physiological processes of the subject such as cardiac cycles, respiratory cycles, body temperature, position/orientation, or the like. As an example, the computing device can bin OAE audio data to a first bin if it occurs during peak electrical activity during a cardiac cycle and can bin OAE audio data to a second bin if it occurs during minimal cardiac activity of a cardiac cycle. Accordingly, the computing device can process different portions of OAE audio data differently based on the bin to which it is assigned. For example, the computing device can apply a first transfer function to OAE audio data in a first bin and can apply a second transfer function to OAE audio data in a second bin, such as when determining physiological characteristics of the subject from the OAE audio data. Binning OAE audio data can include assigning metadata to the OAE audio data indicating to which bin the OAE audio data is assigned.

Adjusting OAE audio data can include adjusting a transfer function associated with the OAE audio data, for example that can be applied to the OAE audio data to assess physiological characteristics of a subject. Adjusting the transfer function can include selecting a transfer function from a set of predetermined transfer functions. As an example, the processor can select a certain transfer function to apply to the OAE audio data if the physiological data that corresponds (e.g., in time) to the occurrence of other features in the physiological data (which can indicate occurrence of physiological events that might not introduce noise to the OAE audio data). Adjusting the transfer function can include adjusting a mapping of the transfer function such as to map OAE audio data inputs to physiological characteristic outputs.

At block 809, the computing device can determine one or more physiological characteristics of a subject based on OAE audio data which can include adjusted OAE audio data. In some implementations, the computing device can further process the OAE audio data such as to generate a user hearing profile or any other audiometry data described herein which can be used to determine the physiological characteristics.

The physiological characteristics can include auditory characteristics of the subject. The physiological characteristics can include inner ear characteristics. The physiological characteristics may indicate an operational capability of one or more of a cochlea, an organ of corti, hair cells, outer hair cells, inner hair cells, tectorial membrane, and/or auditory nerve of the subject. The physiological characteristics can include an indication of hearing sensitivity, hearing loss, hearing loss at certain frequencies, or the like. For example, physiological characteristics may indicate whether outer hair cells of the subject are operating to amplify certain frequencies by moving a tectorial membrane of the subject. In some implementations, the processor may determine the physiological characteristics as part of a screening or diagnostic assessment of acoustic function. For example, the physiological characteristics may be a part of a screening regimen to determine the auditory health of newborn babies. As another example, the processor can monitor ototoxicity damage to hearing health (e.g., caused by ototoxic drugs used to treat cancer) based on monitoring auditory function. In some implementations, the processor can determine physiological characteristics based on one or more of a phase, amplitude, latency, and/or frequency of the OAE audio data (or changes thereof).

The physiological characteristics can include oxygenation of the subject, including intracranial oxygenation. The computing device can determine oxygenation based on at least the OAE audio data, alone or in combination with, the physiological data, such as blood oxygenation saturation obtained from a pulse oximeter. OAE audio data can change based on oxygenation of the inner ear. The computing device can analyze a phase change of the OAE audio data, and how the phase change corresponds to blood oxygenation saturation to determine an indication of intracranial oxygenation of the subject. The inner ear is sensitive to changes in oxygenation. For example, the auditory nerve and/or hair cells may not function properly to generate OAEs. By using inner car physiological data, such as OAE data, the processer can indicate changes in oxygenation to prevent harmful physiological consequences such as excessive oxygen saturation (e.g., hyperoxia), which can lead to blindness in newborns, or under oxygen saturation (e.g., hypoxia), which can lead to permanent brain damage.

The physiological characteristics can include intracranial pressure (ICP). Changes in ICP can cause changes in OAE (such as phase changes, amplitude changes, etc.). The computing device can monitor changes in OAE to determine changes in ICP. In turn, the computing device can determine cardiac activity, respiratory activity, and/or orientation of the subject based on the ICP. Changes in cardiac activity, such as during a heart beat cycle, can change blood pressure, which can change ICP. Changes in respiratory activity, such as during a respiration cycle, can change blood pressure, which can change ICP. Changes in orientation of the subject (e.g., raising or lowering head) can change ICP. The processor can analyze OAE audio data alone or in combination with cardiac data to determine an indication of intracranial pressure. For example, the processor can analyze a phase change of the OAE data, and how the phase change corresponds to heart beat cycles to determine an indication of intracranial pressure of the subject.

At block 811, the computing device can optionally generate a hearing transfer function for the user based on the OAE audio data. A computing device, such as an auricular device, can implement a hearing transfer function for user-specific audio playback. For example, an auricular device can adjust audio playback according to a hearing transfer function to improve the auditory listening experience of the user. As described herein, a hearing transfer function can indicate which frequencies to adjust and by how much to adjust their amplitudes so that a user's perceives those frequencies at a desired decibel level (e.g., to recreate "normal" hearing).

ADDITIONAL CONSIDERATIONS

Certain categories of persons, such as caregivers, clinicians, doctors, nurses, and friends and family of a user, may be used interchangeably to describe a person providing care to the user. Furthermore, patients or users used herein interchangeably refer to a person who is wearing a sensor or is connected to a sensor or whose measurements are used to determine a physiological parameter or a condition. Parameters may be, be associated with, and/or be represented by, measured values, display icons, alphanumeric characters, graphs, gages, power bars, trends, or combinations. Real time data may correspond to active monitoring of a user, however, such real time data may not be synchronous to an actual physiological state at a particular moment. Measurement value(s) of a parameter and the parameter used herein such as, $SpO_2$, RR, $PaO_2$ and the like, unless specifically stated otherwise, or otherwise understood with the context as used is generally intended to convey a measurement or determination that is responsive to the physiological parameter.

Although certain implementations and examples have been described herein, it will be understood by those skilled in the art that many aspects of the systems and devices shown and described in the present disclosure may be differently combined and/or modified to form still further implementations or acceptable examples. All such modifications and variations are intended to be included herein within the scope of this disclosure. A wide variety of designs and approaches are possible. No feature, structure, or step disclosed herein is essential or indispensable. The various features and processes described herein may be used independently of one another, or may be combined in various ways. For example, elements may be added to, removed from, or rearranged compared to the disclosed example implementations. All possible combinations and sub-combinations are intended to fall within the scope of this disclosure.

Any methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state, or certain method or process blocks may be omitted, or certain blocks or states may be performed in a reverse order from what is shown and/or described. The example blocks or states may be performed in serial, in parallel, or in some other manner. Blocks or states may be added to or removed from the disclosed example implementations.

The methods disclosed herein may include certain actions taken by a practitioner; however, they can also include any third-party instruction of those actions, either expressly or by implication.

The methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. The computer system may be a cloud-based computing system whose processing resources are shared by multiple distinct entities or other users. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames).

Many other variations than those described herein will be apparent from this disclosure. For example, depending on the implementation, certain acts, events, or functions of any of the algorithms described herein can be performed in a different sequence, can be added, merged, or left out altogether (for example, not all described acts or events are necessary for the practice of the algorithms). Moreover, in certain implementations, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Various illustrative logical blocks, modules, routines, and algorithm steps that may be described in connection with the disclosure herein can be implemented as electronic hardware (e.g., ASICs or FPGA devices), computer software that runs on computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the implementations disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, controller, microcontroller, or state machine, combinations of the same, or the like. A processor can include electrical circuitry configured to process computer-executable instructions. A processor can include an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more embodiments necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

As used herein, "real-time" or "substantial real-time" may refer to events (e.g., receiving, processing, transmitting, displaying etc.) that occur at a same time as each other, during a same time as each other, or overlap in time with each other. "Real-time" may refer to events that occur at distinct or non-overlapping times the difference between which is imperceptible and/or inconsequential to humans such as delays arising from electrical conduction or transmission. A human may perceive real-time events as occurring simultaneously, regardless of whether the real-time events occur at an exact same time. As a non-limiting example, "real-time" may refer to events that occur within a time frame of each other that is on the order of milliseconds, seconds, tens of seconds, or minutes. For example, "real-time" may refer to events that occur within a time frame of less than 1 minute, less than 30 seconds, less than 10 seconds, less than 1 second, less than 0.05 seconds, less than 0.01 seconds, less than 0.005 seconds, less than 0.001 seconds, etc.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, "system," "instrument," "apparatus," and "device" generally encompass both the hardware (for example, mechanical and electronic) and, in some implementations, associated software (for example, specialized computer programs for operational control) components.

It should be emphasized that many variations and modifications may be made to the herein-described implementations, the elements of which are to be understood as being among other acceptable examples. All such modifications and variations are intended to be included herein within the scope of this disclosure. Any section headings used herein are merely provided to enhance readability and are not intended to limit the scope of the implementations disclosed in a particular section to the features or elements disclosed in that section. The foregoing description details certain implementations. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for monitoring auditory health of a user comprising:
- an auricular device comprising:
  - a microphone oriented toward an inner ear of the user when the auricular device is worn by the user and configured to generate OAE audio data responsive to detecting one or more otoacoustic emissions originating from the inner ear of the user; and
- one or more hardware processors associated with the auricular device configured to:
  - access the OAE audio data originating from the microphone;
  - access physiological data of the user originating from a physiological sensor coupled to the user;
  - detect a feature of the physiological data in a time-domain based on a value of the physiological data exceeding a threshold, the feature of the physiological data corresponding to a physiological event generating noise during the one or more otoacoustic emissions, the noise having a noise frequency within a threshold of an OAE frequency of the one or more otoacoustic emissions;
  - adjust a portion of the OAE audio data responsive to detecting the feature of the physiological data to reduce interference of the noise from the physiological event on the OAE audio data, the portion of the OAE audio data corresponding to the feature of the physiological data in the time-domain; and determine one or more physiological characteristics of the user based on the OAE audio data.

2. The system of claim 1 wherein the physiological data includes one or more of PPG data originating from an optical sensor or ECG data originating from an ECG sensor comprising an electrode.

3. The system of claim 1 wherein the one or more hardware processors are configured to:

generate one or more waveforms from the physiological data including an ECG waveform, a respiration waveform, or a pulse waveform; and determine the feature of the physiological data from the one or more waveforms.

4. The system of claim 1 wherein the auricular device further comprises a speaker configured to emit an audio stimulus toward the inner ear of the user, the audio stimulus configured to evoke the one or more otoacoustic emissions, wherein the one or more hardware processors are configured to adjust an operation of the speaker based on the physiological data to control the one or more otoacoustic emissions.

5. The system of claim 4, wherein adjusting the operation of the speaker includes adjusting a time the speaker emits the audio stimulus to avoid evoking the one or more otoacoustic emissions during the physiological event.

6. The system of claim 4, wherein adjusting the operation of the speaker includes adjusting a stimulus frequency of the audio stimulus to adjust the OAE frequency of the one or more otoacoustic emissions to avoid interference with the noise from the physiological event.

7. The system of claim 4, wherein adjusting the operation of the speaker includes adjusting a stimulus amplitude of the audio stimulus to evoke the one or more otoacoustic emissions with an OAE amplitude being greater than a noise amplitude of the noise from the physiological event.

8. The system of claim 4, wherein the one or more hardware processors are configured to:

estimate a future physiological event based on the physiological data; and adjust the operation of the speaker based on the estimated future physiological event.

9. The system of claim 1 wherein adjusting the portion of the OAE audio data includes discarding one or more values of the OAE audio data.

10. The system of claim 1 wherein adjusting the portion of the OAE audio data includes assigning one or more weights to the OAE audio data.

11. The system of claim 1 wherein adjusting the portion of the OAE audio data includes binning the OAE audio data.

12. The system of claim 1 wherein the physiological sensor is integrated with the auricular device.

13. The system of claim 1 wherein the one or more physiological characteristics of the user includes a hearing sensitivity of the user.

14. The system of claim 1 wherein the one or more physiological characteristics of the user includes an oxygenation of the user.

15. The system of claim 1 wherein the one or more physiological characteristics of the user includes an intracranial pressure of the user.

16. The system of claim 1 wherein the one or more hardware processors are configured to generate a hearing transfer function from the OAE audio data to implement user-specific audio playback.

17. A method for monitoring auditory health of a user comprising:

detecting one or more otoacoustic emissions with a microphone of an auricular device worn by the user, the one or more otoacoustic emissions originating from an inner ear of the user;

generating OAE audio data with the microphone responsive to detecting the one or more otoacoustic emissions; and under control of one or more hardware processors:

accessing the OAE audio data originating from the microphone;

accessing physiological data of the user originating from a physiological sensor coupled to the user;

detecting a feature of the physiological data in a time-domain based on a value of the physiological data exceeding a threshold, the feature of the physiological data corresponding to a physiological event generating noise during the one or more otoacoustic emissions, the noise having a noise frequency within a threshold of an OAE frequency of the one or more otoacoustic emissions;

adjusting a portion of the OAE audio data responsive to detecting the feature of the physiological data to reduce interference of the noise from the physiological event on the OAE audio data, the portion of the OAE audio data corresponding to the feature of the physiological data in the time-domain; and determining one or more physiological characteristics of the user based on the OAE audio data.

18. The method of claim 17 further comprising:

generating one or more waveforms from the physiological data including an ECG waveform, a respiration waveform, or a pulse waveform; and determining the feature of the physiological data from the one or more waveforms.

19. Non-transitory computer-readable media including computer-executable instructions that, when executed by a computing system, cause the computing system to perform operations comprising:

accessing OAE audio data generated by a microphone of an auricular device responsive to detecting one or more otoacoustic emissions emanating from an inner ear of a user;

accessing physiological data of the user originating from a physiological sensor coupled to the user;

detecting a feature of the physiological data in a time-domain based on a value of the physiological data exceeding a threshold, the feature of the physiological data corresponding to a physiological event generating noise during the one or more otoacoustic emissions, the noise having a noise frequency within a threshold of an OAE frequency of the one or more otoacoustic emissions;

adjusting a portion of the OAE audio data responsive to detecting the feature of the physiological data to reduce interference of the noise from the physiological event on the OAE audio data, the portion of the OAE audio data corresponding to the feature of the physiological data in the time-domain; and determining one or more physiological characteristics of the user based on the OAE audio data.

20. The non-transitory computer-readable media of claim 19 wherein the computer-executable instructions, when executed by the computing system, cause the computing system to perform operations comprising:

generating one or more waveforms from the physiological data including an ECG waveform, a respiration waveform, or a pulse waveform; and determining the feature of the physiological data from the one or more waveforms.

* * * * *